US012587862B2

(12) United States Patent
Zoulias et al.

(10) Patent No.: US 12,587,862 B2
(45) Date of Patent: Mar. 24, 2026

(54) SIGNAL INTELLIGENCE DATA COLLECTION

(71) Applicant: Perfecta Federal, LLC, Springfield, VA (US)

(72) Inventors: George Zoulias, Springfield, VA (US); Chris Young, Springfield, VA (US)

(73) Assignee: Perfecta Federal, LLC, Springfield, VA (US)

( * ) Notice: Subject to any disclaimer, the term of this patent is extended or adjusted under 35 U.S.C. 154(b) by 311 days.

(21) Appl. No.: 18/228,544

(22) Filed: Jul. 31, 2023

(65) Prior Publication Data

US 2025/0168647 A1 May 22, 2025

Related U.S. Application Data

(60) Provisional application No. 63/451,858, filed on Mar. 13, 2023.

(51) Int. Cl.
*H04W 12/80* (2021.01)
*H04W 12/121* (2021.01)
*H04W 24/08* (2009.01)

(52) U.S. Cl.
CPC ......... *H04W 12/80* (2021.01); *H04W 12/121* (2021.01); *H04W 24/08* (2013.01)

(58) Field of Classification Search
CPC .......... G06F 21/44; G06F 21/50; G06F 21/57; G06F 21/577; H04W 12/80; H04W 12/08; H04W 12/12; H04W 12/121; H04W 24/08
See application file for complete search history.

(56) References Cited

U.S. PATENT DOCUMENTS

| | | | | |
|---|---|---|---|---|
| 2015/0350228 A1* | 12/2015 | Baxley | ............... | H04L 63/1483 |
| | | | | 726/23 |
| 2015/0350914 A1* | 12/2015 | Baxley | ................. | H04W 72/20 |
| | | | | 726/11 |
| 2016/0124071 A1* | 5/2016 | Baxley | .................... | H04W 4/70 |
| | | | | 348/143 |

(Continued)

FOREIGN PATENT DOCUMENTS

| | | | | |
|---|---|---|---|---|
| CA | 2965247 C | * | 7/2020 | ........ H04M 1/72463 |

OTHER PUBLICATIONS

Santana et al. , "Integrating Cognitive Radio with Unmanned Aerial Vehicles", Sensors, 27 pages (Year: 2021).*

*Primary Examiner* — Mong-Thuy T Tran
(74) *Attorney, Agent, or Firm* — Conley Rose, P.C.

(57) ABSTRACT

A radio signal surveillance (RSS) device comprises a plurality of radio transceivers of multiple wireless communication technology types and a software-defined radio. The RSS device may be used to scan for signal intelligence data via at least one of one or more transceivers or the software-defined radio that monitors radio signals of one or more radio signal emission devices. The RSS device may send the signal intelligence data via a secure communication channel to a data collection platform. The RSS device may further receive a command from the data collection platform to deactivate or activate at least one radio transceiver of one or more wireless communication technology types and reconfigure according to the command. The RSS device is then used to scan for additional signal intelligence data from radio signals of one or more radio signal emission devices.

20 Claims, 11 Drawing Sheets

(56)            References Cited

U.S. PATENT DOCUMENTS

| | | | |
|---|---|---|---|
| 2016/0127931 A1* | 5/2016 | Baxley | G06T 7/60 |
| | | | 455/67.16 |
| 2018/0351826 A1* | 12/2018 | Ahlport | G06F 3/04842 |
| 2021/0360450 A1* | 11/2021 | Kleinbeck | H04B 17/20 |
| 2025/0309944 A1* | 10/2025 | Haghighat | H04B 7/0691 |

* cited by examiner

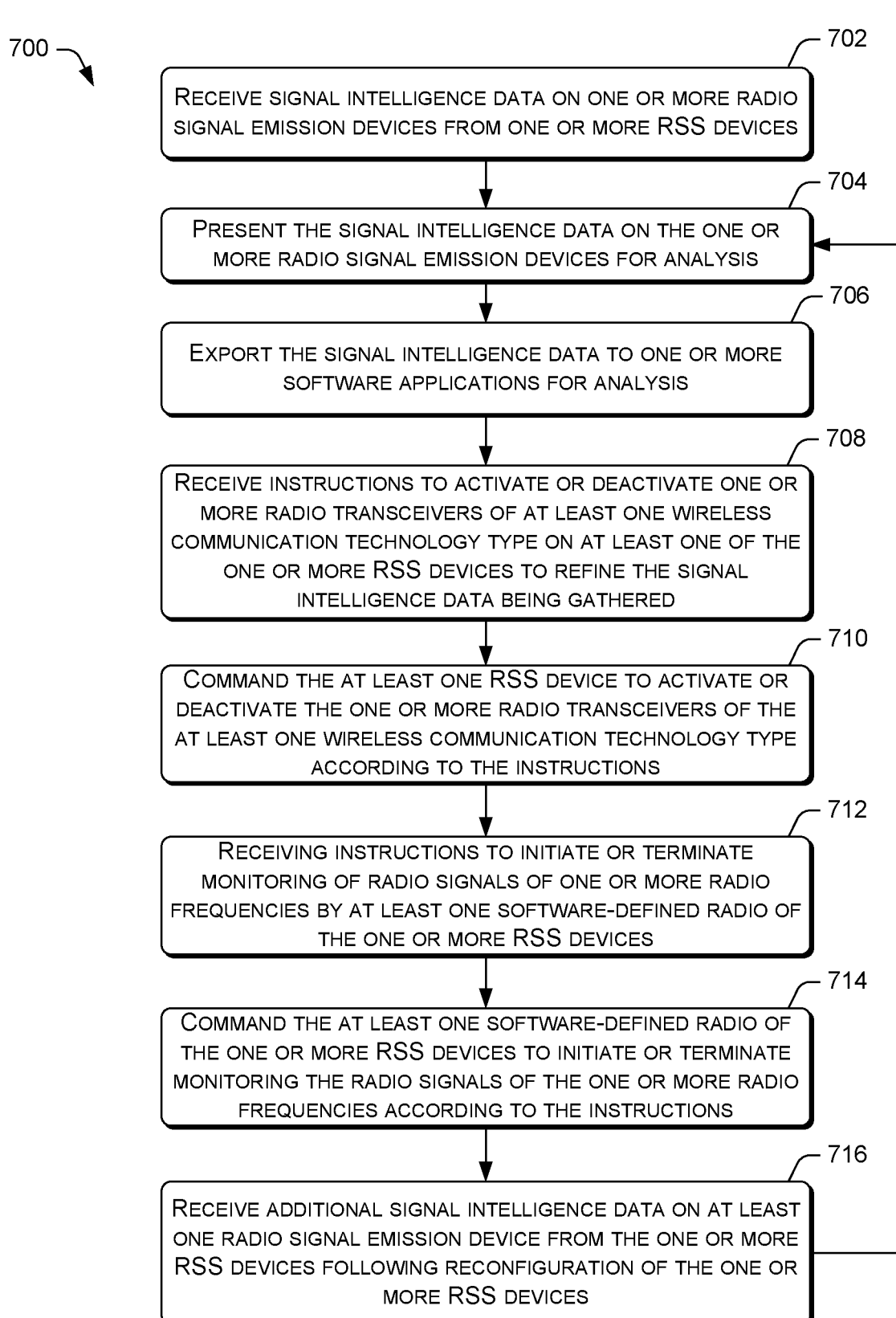

700

702
RECEIVE SIGNAL INTELLIGENCE DATA ON ONE OR MORE RADIO SIGNAL EMISSION DEVICES FROM ONE OR MORE RSS DEVICES

704
PRESENT THE SIGNAL INTELLIGENCE DATA ON THE ONE OR MORE RADIO SIGNAL EMISSION DEVICES FOR ANALYSIS

706
EXPORT THE SIGNAL INTELLIGENCE DATA TO ONE OR MORE SOFTWARE APPLICATIONS FOR ANALYSIS

708
RECEIVE INSTRUCTIONS TO ACTIVATE OR DEACTIVATE ONE OR MORE RADIO TRANSCEIVERS OF AT LEAST ONE WIRELESS COMMUNICATION TECHNOLOGY TYPE ON AT LEAST ONE OF THE ONE OR MORE RSS DEVICES TO REFINE THE SIGNAL INTELLIGENCE DATA BEING GATHERED

710
COMMAND THE AT LEAST ONE RSS DEVICE TO ACTIVATE OR DEACTIVATE THE ONE OR MORE RADIO TRANSCEIVERS OF THE AT LEAST ONE WIRELESS COMMUNICATION TECHNOLOGY TYPE ACCORDING TO THE INSTRUCTIONS

712
RECEIVING INSTRUCTIONS TO INITIATE OR TERMINATE MONITORING OF RADIO SIGNALS OF ONE OR MORE RADIO FREQUENCIES BY AT LEAST ONE SOFTWARE-DEFINED RADIO OF THE ONE OR MORE RSS DEVICES

714
COMMAND THE AT LEAST ONE SOFTWARE-DEFINED RADIO OF THE ONE OR MORE RSS DEVICES TO INITIATE OR TERMINATE MONITORING THE RADIO SIGNALS OF THE ONE OR MORE RADIO FREQUENCIES ACCORDING TO THE INSTRUCTIONS

716
RECEIVE ADDITIONAL SIGNAL INTELLIGENCE DATA ON AT LEAST ONE RADIO SIGNAL EMISSION DEVICE FROM THE ONE OR MORE RSS DEVICES FOLLOWING RECONFIGURATION OF THE ONE OR MORE RSS DEVICES

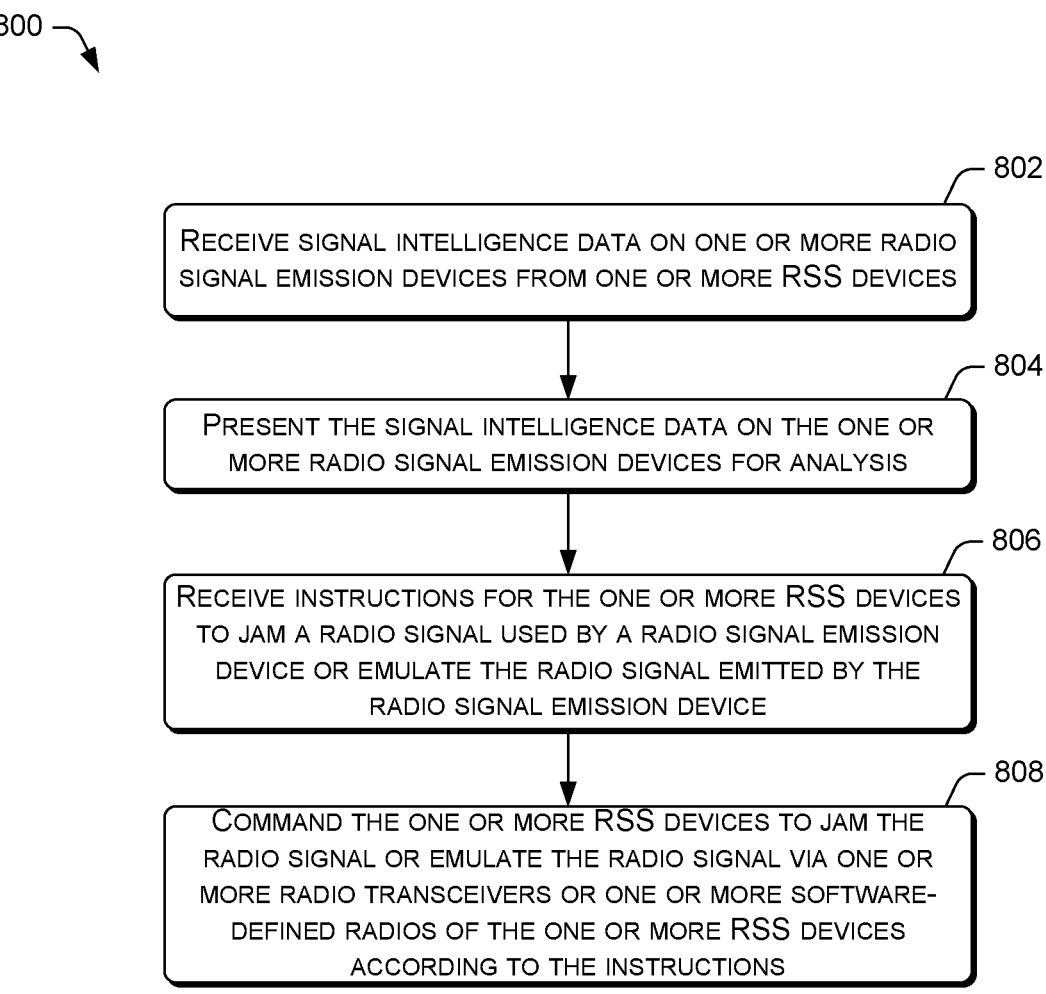

802

RECEIVE SIGNAL INTELLIGENCE DATA ON ONE OR MORE RADIO SIGNAL EMISSION DEVICES FROM ONE OR MORE RSS DEVICES

804

PRESENT THE SIGNAL INTELLIGENCE DATA ON THE ONE OR MORE RADIO SIGNAL EMISSION DEVICES FOR ANALYSIS

806

RECEIVE INSTRUCTIONS FOR THE ONE OR MORE RSS DEVICES TO JAM A RADIO SIGNAL USED BY A RADIO SIGNAL EMISSION DEVICE OR EMULATE THE RADIO SIGNAL EMITTED BY THE RADIO SIGNAL EMISSION DEVICE

808

COMMAND THE ONE OR MORE RSS DEVICES TO JAM THE RADIO SIGNAL OR EMULATE THE RADIO SIGNAL VIA ONE OR MORE RADIO TRANSCEIVERS OR ONE OR MORE SOFTWARE-DEFINED RADIOS OF THE ONE OR MORE RSS DEVICES ACCORDING TO THE INSTRUCTIONS

FIG. 8

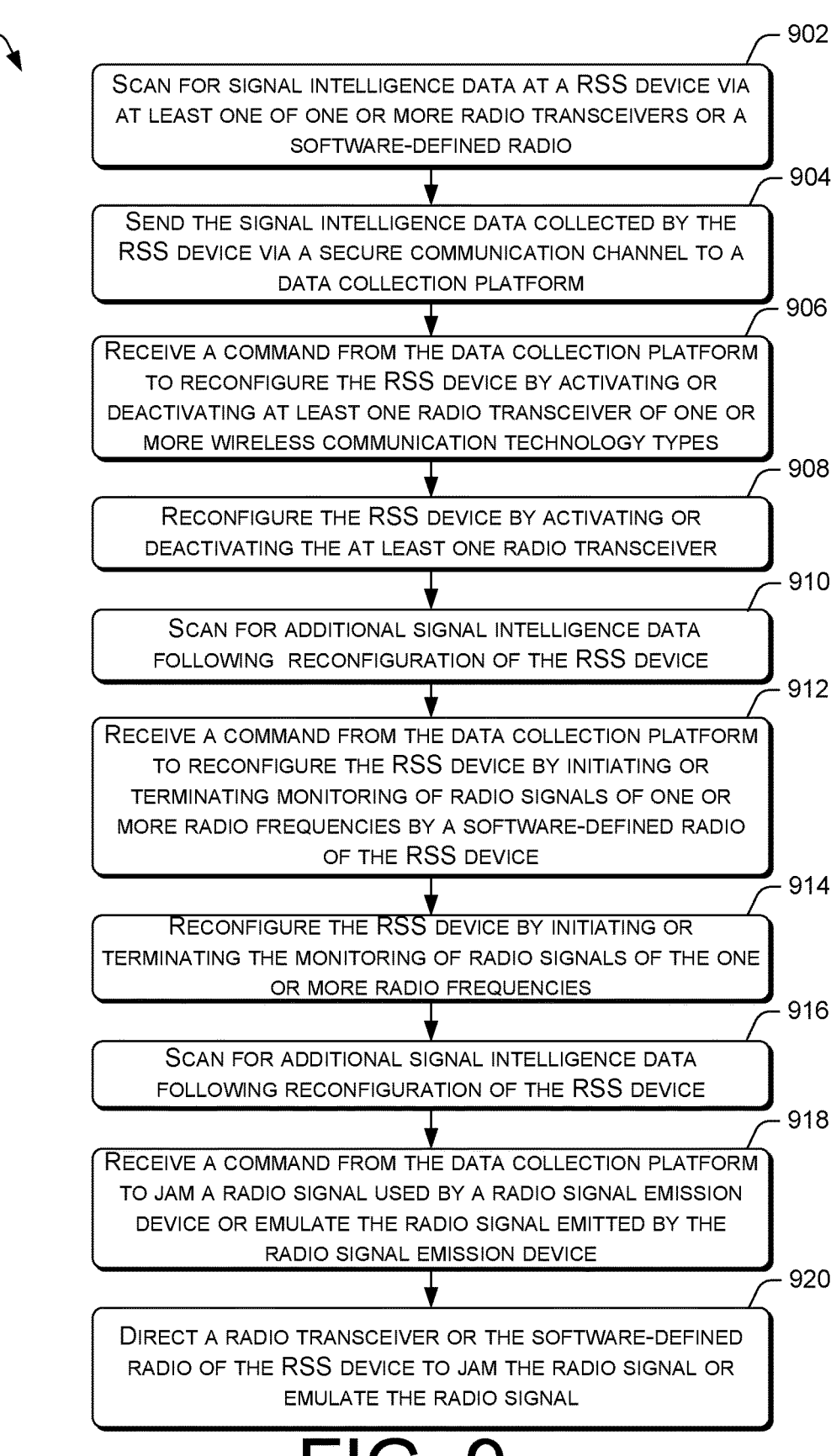

900

902
SCAN FOR SIGNAL INTELLIGENCE DATA AT A RSS DEVICE VIA AT LEAST ONE OF ONE OR MORE RADIO TRANSCEIVERS OR A SOFTWARE-DEFINED RADIO

904
SEND THE SIGNAL INTELLIGENCE DATA COLLECTED BY THE RSS DEVICE VIA A SECURE COMMUNICATION CHANNEL TO A DATA COLLECTION PLATFORM

906
RECEIVE A COMMAND FROM THE DATA COLLECTION PLATFORM TO RECONFIGURE THE RSS DEVICE BY ACTIVATING OR DEACTIVATING AT LEAST ONE RADIO TRANSCEIVER OF ONE OR MORE WIRELESS COMMUNICATION TECHNOLOGY TYPES

908
RECONFIGURE THE RSS DEVICE BY ACTIVATING OR DEACTIVATING THE AT LEAST ONE RADIO TRANSCEIVER

910
SCAN FOR ADDITIONAL SIGNAL INTELLIGENCE DATA FOLLOWING RECONFIGURATION OF THE RSS DEVICE

912
RECEIVE A COMMAND FROM THE DATA COLLECTION PLATFORM TO RECONFIGURE THE RSS DEVICE BY INITIATING OR TERMINATING MONITORING OF RADIO SIGNALS OF ONE OR MORE RADIO FREQUENCIES BY A SOFTWARE-DEFINED RADIO OF THE RSS DEVICE

914
RECONFIGURE THE RSS DEVICE BY INITIATING OR TERMINATING THE MONITORING OF RADIO SIGNALS OF THE ONE OR MORE RADIO FREQUENCIES

916
SCAN FOR ADDITIONAL SIGNAL INTELLIGENCE DATA FOLLOWING RECONFIGURATION OF THE RSS DEVICE

918
RECEIVE A COMMAND FROM THE DATA COLLECTION PLATFORM TO JAM A RADIO SIGNAL USED BY A RADIO SIGNAL EMISSION DEVICE OR EMULATE THE RADIO SIGNAL EMITTED BY THE RADIO SIGNAL EMISSION DEVICE

920
DIRECT A RADIO TRANSCEIVER OR THE SOFTWARE-DEFINED RADIO OF THE RSS DEVICE TO JAM THE RADIO SIGNAL OR EMULATE THE RADIO SIGNAL

FIG. 9

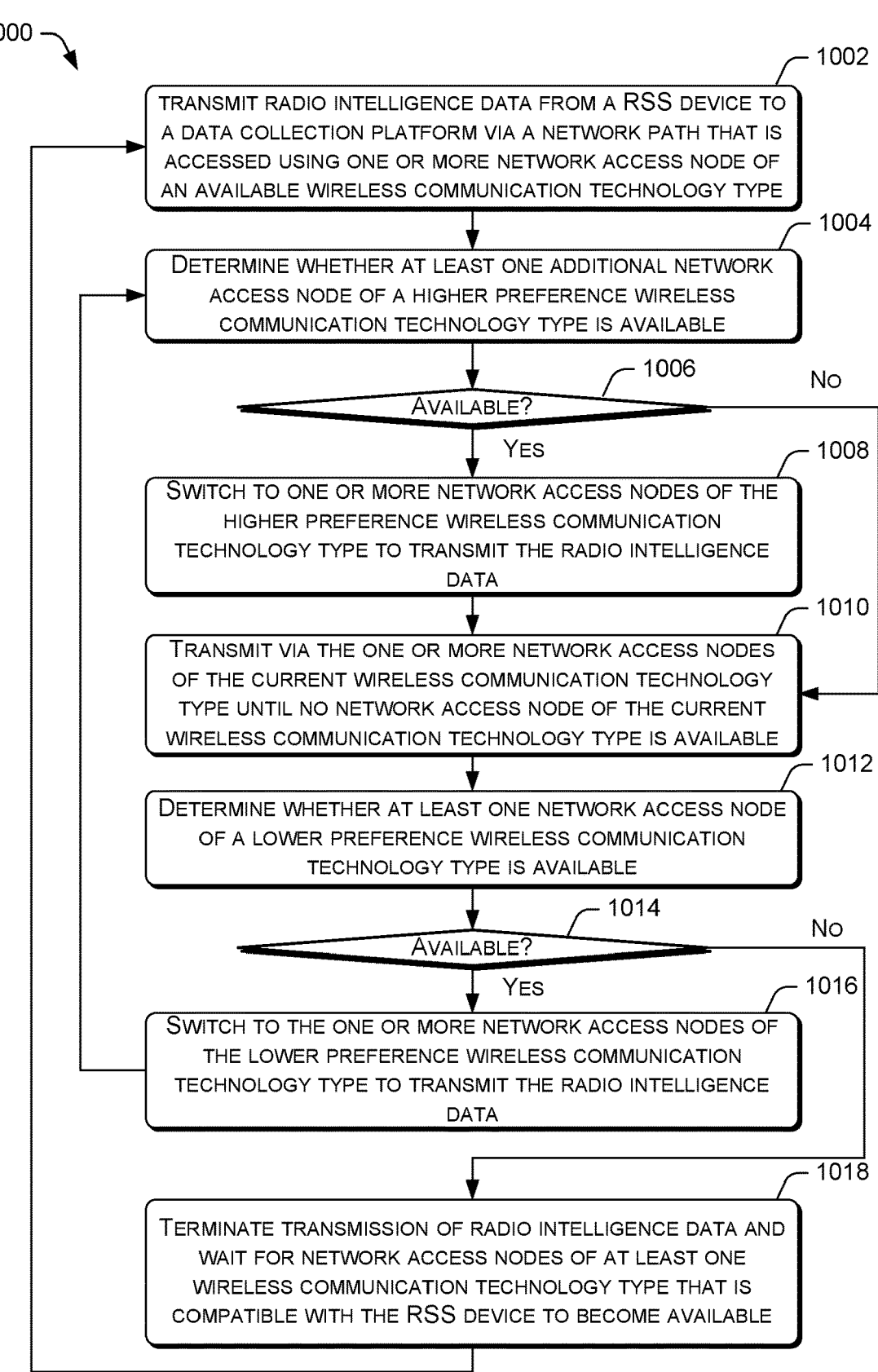

1000

1002
TRANSMIT RADIO INTELLIGENCE DATA FROM A RSS DEVICE TO A DATA COLLECTION PLATFORM VIA A NETWORK PATH THAT IS ACCESSED USING ONE OR MORE NETWORK ACCESS NODE OF AN AVAILABLE WIRELESS COMMUNICATION TECHNOLOGY TYPE

1004
DETERMINE WHETHER AT LEAST ONE ADDITIONAL NETWORK ACCESS NODE OF A HIGHER PREFERENCE WIRELESS COMMUNICATION TECHNOLOGY TYPE IS AVAILABLE

1006
AVAILABLE?    No

YES

1008
SWITCH TO ONE OR MORE NETWORK ACCESS NODES OF THE HIGHER PREFERENCE WIRELESS COMMUNICATION TECHNOLOGY TYPE TO TRANSMIT THE RADIO INTELLIGENCE DATA

1010
TRANSMIT VIA THE ONE OR MORE NETWORK ACCESS NODES OF THE CURRENT WIRELESS COMMUNICATION TECHNOLOGY TYPE UNTIL NO NETWORK ACCESS NODE OF THE CURRENT WIRELESS COMMUNICATION TECHNOLOGY TYPE IS AVAILABLE

1012
DETERMINE WHETHER AT LEAST ONE NETWORK ACCESS NODE OF A LOWER PREFERENCE WIRELESS COMMUNICATION TECHNOLOGY TYPE IS AVAILABLE

1014
AVAILABLE?    No

YES

1016
SWITCH TO THE ONE OR MORE NETWORK ACCESS NODES OF THE LOWER PREFERENCE WIRELESS COMMUNICATION TECHNOLOGY TYPE TO TRANSMIT THE RADIO INTELLIGENCE DATA

1018
TERMINATE TRANSMISSION OF RADIO INTELLIGENCE DATA AND WAIT FOR NETWORK ACCESS NODES OF AT LEAST ONE WIRELESS COMMUNICATION TECHNOLOGY TYPE THAT IS COMPATIBLE WITH THE RSS DEVICE TO BECOME AVAILABLE

RECEIVE SIGNAL INTELLIGENCE DATA FOR A RADIO SIGNAL EMISSION DEVICE

1104

IDENTIFY AT LEAST ONE OF A HARDWARE VULNERABILITY OR A SOFTWARE VULNERABILITY OF THE RADIO SIGNAL EMISSION DEVICE BASED AT LEAST ON THE SIGNAL INTELLIGENCE DATA

1106

PRESENT THE AT LEAST ONE OF THE HARDWARE VULNERABILITY OR THE SOFTWARE VULNERABILITY OF THE RADIO SIGNAL EMISSION DEVICE

SIGNAL INTELLIGENCE DATA COLLECTION

CROSS-REFERENCE TO RELATED PATENT APPLICATION

This application claims priority to U.S. Provisional Patent Application No. 63/451,858, filed on Mar. 13, 2023, entitled "Signal Intelligence Data Collection," which is hereby incorporated by reference in its entirety.

This Invention was made with Government support under Agreement No. W50RAJ-21-9-0007, awarded by ARMY RCCTO, and Agreement No. H92405-21-9-P012, awarded by USSOCOM. The Government has certain rights in this invention.

BACKGROUND

Mobile communication devices, such as smartphones and laptop computers, have become ubiquitous tools for modern life. However, some malicious actors and criminals may use mobile communication devices to facilitate the planning and execution of destructive acts or commit crimes. Accordingly, the collection of signal intelligence data on the radio signals emitted by mobile devices in a geographical area may assist government agencies in preventing criminal or destructive acts. For example, such signal intelligence data may be used by governmental agencies to detect the presence of criminals or malicious actors in a geographical area such that appropriate action may be taken.

SUMMARY

Described herein are techniques for using radio signal surveillance (RSS) devices to collect signal intelligence data on radio signal emission devices in a geographical area. The radio signal emission devices may include devices that use various wireless communication technologies and radio spectrums to communicate with other devices. For example, the wireless communication technologies may include cellular, Wi-Fi, Bluetooth, two-way radio, and/or so forth. The radio signal emission devices may include mobile phones, laptop computers, Internet-of-Things (IoT) devices, cellular base stations, Wi-Fi access points, vehicle infotainment systems, two-way radios, and/or so forth. The RSS devices may have multiple form factors. For example, an RSS device may be a handheld portable device, a body-worn device that can be worn on the body of a person, a vehicle mountable device, an airborne device that is mounted on an unmanned aerial vehicle (UAV), etc. An RSS device may be equipped with multiple radio transceivers of different wireless communication technologies and a software-defined radio for monitoring radio signals of radio signal emission devices that are in the vicinity of the RSS device. Furthermore, in some instances, an RSS device may be equipped with a user interface (e.g., a user interface panel and/or a display) that enables activation or deactivation of radio transceivers of the device that correspond to different types of wireless communication technologies. In this way, the RSS device may be manually configured to collect specific signal intelligence data of selected wireless communication technology types on the radio signal emission devices. For example, an RSS device may be configured to collect signal intelligence data on cellular signals and Wi-Fi signals emitted by the radio signal emission devices, but not signal intelligence data on Bluetooth signals emitted by the devices.

The RSS devices may transmit the collected signal intelligence data to a data collection platform. The RSS devices may use various wireless communication technologies and radio spectrums to communicate with the data collection platform. Such wireless communication technologies may include cellular, Wi-Fi, Bluetooth, military-specific radio communication technologies (e.g., Single Channel Ground and Airborne Radio System (SINCGARS), AN/PRC-148, etc.), and/or so forth. The wireless communication technologies may be used by the RSS devices in a hierarchical manner such that the devices are configured to initially use a network access node of a most preferred wireless communication technology, and then use one or more less preferred wireless communication technologies in a failover manner when network access nodes of more preferred wireless communication technologies are unavailable. The data collection platform may be a server-based backend service that stores and presents the signal intelligence data to authorized users of the data collection platform. In some embodiments, the data collection platform may be configured to execute software applications that analyze the signal intelligence data and/or send the data to third-party applications for analysis.

In other embodiments, the data collection platform may be used to remotely instruct an RSS device to activate or deactivate one or more radio transceivers of specific wireless communication technology types as the RSS device is collecting signal intelligence data. In this way, the data collection platform may dynamically change the type of signal intelligence data that is collected by RSS devices after an initial deployment of the devices. Furthermore, the data collection platform may also be used to remotely configure the software-defined radio of an RSS device such that the radio traffic (e.g., voice traffic) of a radio signal emission device (e.g., a handheld two-way radio) may be monitored and/or recorded.

In additional embodiments, the data collection platform may be used to remotely activate the one or more radio transceivers and/or the software-defined radio of an RSS device to disrupt the wireless communications of radio signal emission devices. For example, a radio transceiver of the RSS device may be activated to jam radio signals of a specific wireless communication technology and/or radio frequency in the vicinity of the device. In another example, a radio transceiver of the RSS device may be activated to emulate a cellular base station such that a radio signal emission device in the form of a cellular phone may connect to the RSS device instead of an actual cellular base station.

In further embodiments, the data collection platform may include an application component that is configured to identify at least one of a hardware vulnerability or a software vulnerability of a radio signal emission device based at least on the received signal intelligence data collected on the radio signal emission device. The information on the hardware or software vulnerabilities may be further presented by the data collection platform to an authorized operator of the platform.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 7 is a flow diagram of an example process for receiving signal intelligence data on one or more radio signal emission devices at a data collection platform from one or more RSS devices.

FIG. 8 is a flow diagram of an example process for commanding one or more RSS devices to interrupt the wireless communication of one or more radio signal emission devices.

FIG. 9 is a flow diagram of an example process for an RSS device to use a software-defined radio to collect signal intelligence data of one or more radio signal emission devices.

FIG. 10 is a flow diagram of an example process for an RSS device to selectively use network access nodes of multiple wireless communication technology types to transmit signal intelligence data to a data collection platform.

DETAILED DESCRIPTION

Figure 1:
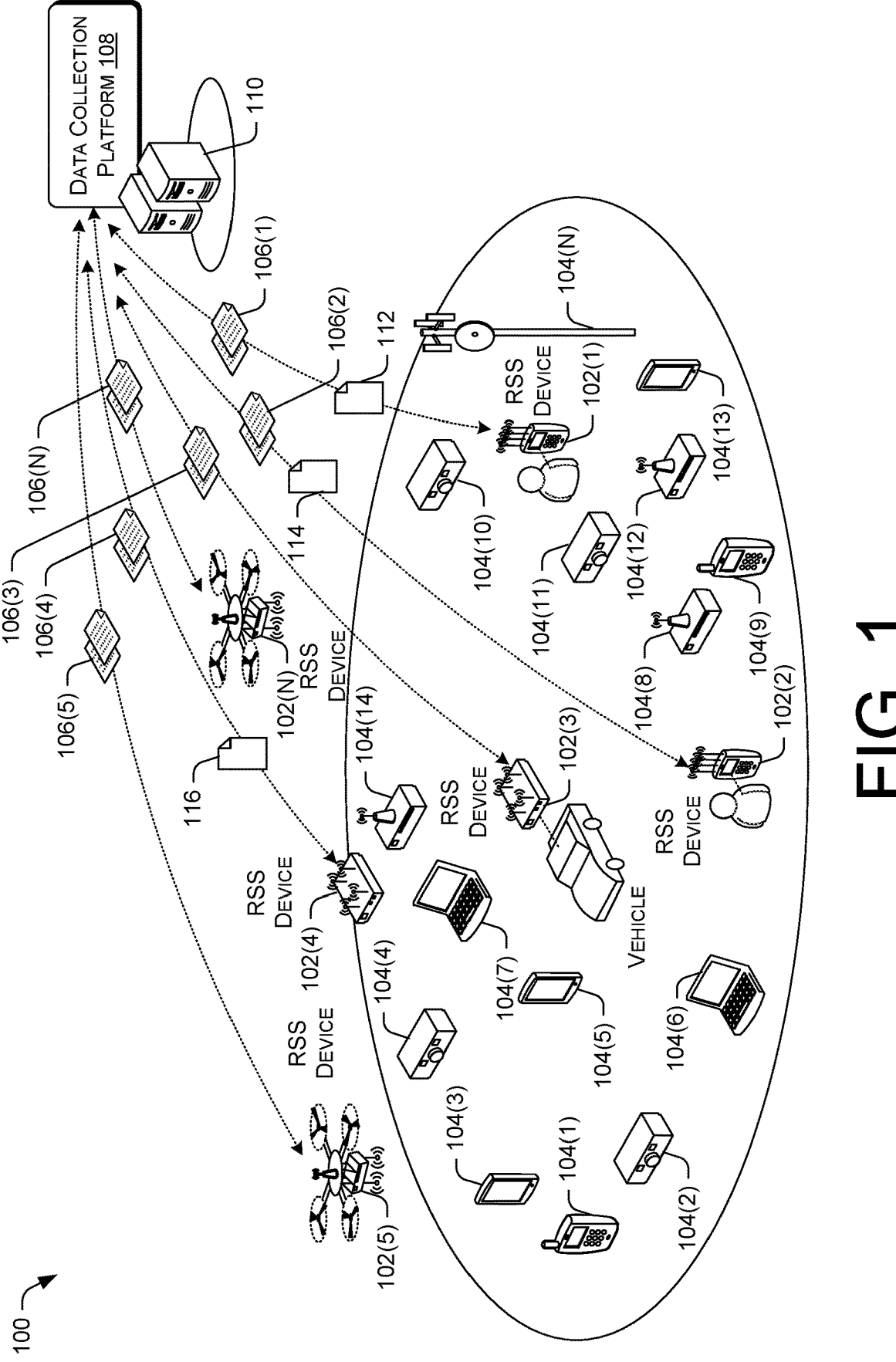
FIG. 1 illustrates an example architecture that enables the collection of signal intelligence data from radio signal emission devices in a geographical area for transmission to a data collection platform.

This disclosure is directed to techniques for using radio signal surveillance (RSS) devices to collect signal intelligence data on radio signal emission devices in a geographical area. The radio signal emission devices may include devices that use various wireless communication technologies and radio spectrums to communicate with other devices. For example, the wireless communication technologies may include cellular, Wi-Fi, Bluetooth, two-way radio, and/or so forth. The radio signal emission devices may include mobile phones, laptop computers, Internet-of-Things (IoT) devices, cellular base stations, Wi-Fi access points (e.g., Wi-Fi routers), vehicle infotainment systems, two-way radios, and/or so forth. The RSS devices may have multiple form factors. For example, an RSS device may be a handheld portable device, a body-worn device that can be worn on the body of a person, a vehicle mountable device, an airborne device that is mounted on an unmanned aerial vehicle (UAV), etc. An RSS device may be equipped with multiple radio transceivers of different wireless communication technologies and a software-defined radio for monitoring radio signals of radio signal emission devices that are in the vicinity of the RSS device. Furthermore, in some instances, an RSS device may be equipped with a user interface (e.g., a user interface panel and/or a display) that enables activation or deactivation of radio transceivers of the device that correspond to different types of wireless communication technologies. In this way, the RSS device may be manually configured at the device to collect specific signal intelligence data of selected wireless communication technology types on the radio signal emission devices, such as cellular, Wi-Fi, Bluetooth, etc. For example, an RSS device may be configured to collect signal intelligence data on cellular signals and Wi-Fi signals emitted by the radio signal emission devices, but not signal intelligence data on Bluetooth signals emitted by the devices. The signal intelligence data collected on a radio signal emission device based on its emitted radio signals may include an identifier of the device, a device type of the device, a media access control (MAC) address of the device, a signal strength measurement (e.g., received signal strength indication (RSSI)) of the radio signal emitted by the device, a signal frequency of the radio signal emitted by the device, a number of and device identifiers of client devices that are wirelessly connected to the device, and/or so forth.

The RSS devices may transmit the collected signal intelligence data to a data collection platform. The RSS devices may use various wireless communication technologies and radio spectrums to communicate with the data collection platform. Such wireless communication technologies may include cellular, Wi-Fi, Bluetooth, military-specific radio communication technologies (e.g., Single Channel Ground and Airborne Radio System (SINCGARS), AN/PRC-148, etc.), and/or so forth. The wireless communication technologies may be used by the RSS devices in a hierarchical manner such that the devices are configured to initially use a network access node of a most preferred wireless communication technology, and then use one or more less preferred wireless communication technologies in a failover manner when network access nodes of more preferred wireless communication technologies are unavailable. The data collection platform may be a server-based backend service that stores and presents the signal intelligence data to authorized users of the data collection platform. In some embodiments, the data collection platform may be configured to execute software applications that analyze the signal intelligence data and/or send the data to third-party applications for analysis.

In other embodiments, the data collection platform may be used to remotely instruct an RSS device to activate or deactivate one or more radio transceivers of specific wireless communication technology types as the RSS device is collecting signal intelligence data. In this way, the data collection platform may dynamically change the type of signal intelligence data that is collected by RSS devices after an initial deployment of the devices. Furthermore, the data collection platform may also be used to remotely configure the software-defined radio of an RSS device such that the radio traffic (e.g., voice traffic) of a radio signal emission device (e.g., a handheld two-way radio) may be monitored and/or recorded.

In additional embodiments, the data collection platform may be used to remotely activate the one or more radio transceivers and/or the software-defined radio of an RSS device to disrupt the wireless communications of radio signal emission devices. For example, a radio transceiver of the RSS device may be activated to jam radio signals of a specific wireless communication technology and/or radio frequency in the vicinity of the device. In another example, a radio transceiver of the RSS device may be activated to emulate a cellular base station such that a radio signal emission device in the form of a cellular phone may connect to the RSS device instead of an actual cellular base station.

In further embodiments, the data collection platform may include an application component that is configured to identify at least one of a hardware vulnerability or a software vulnerability of a radio signal emission device based at least on the received signal intelligence data collected on the radio signal emission device. The information on the hardware or software vulnerabilities may be further presented by the data collection platform to an authorized operator of the platform.

The signal intelligence data collected from a geographical area via the use of RSS devices may be used to detect the presence of criminals or malicious actors in a geographical area, as well as conduct real-life or cyber operations that disrupt or prevent such criminals or malicious actors from carrying out illegal or harmful activities. Furthermore, the signal intelligence data collection and other techniques as described herein are intended for implementation by authorized users with the appropriate governmental and/or legal authorizations. The techniques described herein may be implemented in a number of ways. Example implementations are provided below with reference to the following figures.

Example Architecture

FIG. 1 illustrates an example architecture 100 that enables the collection of signal intelligence data from radio signal emission devices in a geographical area for transmission to a data collection platform. The architecture 100 may include multiple radio signal surveillance devices (RSS) devices 102(1)-102(N) that collect signal intelligence data on wireless communications of radio signal emission devices, such as the radio signal emission devices 104(1)-104(N). The RSS devices 102(1)-102(N) may have multiple form factors, such as a handheld portable device 102(1) that can be worn on the body of a person, a device 102(3) that is mountable to a non-airborne vehicle, in which the vehicle may be a car, a boat, a train or some other non-airborne vehicle, and an airborne device 102(5) that is mounted on an unmanned aerial vehicle (UAV). In some instances, a handheld RSS device may be disguised as an innocuous device that can be left at a surveillance location without arousing suspicious. In other instances, the handheld RSS device may include a fixture mechanism (e.g., magnets, adhesive tape, etc.) that enables the device to be surreptitiously attached to another piece of equipment (e.g., a vehicle) such that the device may be conveyed to a location that is otherwise inaccessible to an operator of the RSS device.

Each of the RSS devices 102(1)-102(N) may be equipped with multiple radio transceivers of different wireless communication technologies and a software-defined radio for monitoring radio signals of radio signal emission devices that are in the vicinity of the RSS device. In various embodiments, an RSS device may be equipped with multiple cellular radio transceivers, multiple Wi-Fi radio transceivers, multiple Bluetooth radio transceivers, a military band radio transceiver, a software-define radio transceiver, and/or so forth. The software-defined radio may be configured to send and receive radio signals across a broad radio frequency range (e.g., 70 megahertz to six gigahertz). The presence of multiple radio transceivers of the same communication technology may enable an RSS device to simultaneously use multiple radio transceivers of the same communication technology type to collect signal intelligence data and communicate with a backend service, e.g., transmit the collected signal intelligence data to a backend server. For example, the RSS device may use a first cellular radio transceiver to collect signal intelligence data on LTE radio traffic of radio signal emission devices while simultaneously using a second cellular radio transceiver to transmit the collected signal intelligence data to the backend server. An RSS device may be further equipped with a user interface (e.g., a user interface panel and/or a display) that enables activation or deactivation of radio transceivers of the device that correspond to different types of wireless communication technologies. In this way, the RSS device may be manually configured at the device to collect specific signal intelligence data of selected wireless communication technology types on the radio signal emission devices prior to the deployment of the device in the field. For example, by activating and deactivation the corresponding radio transceivers of an RSS device via its the user interface, the RSS device may be configured to collect signal intelligence data on cellular signals and Wi-Fi signals emitted by the radio signal emission devices, but not on Bluetooth signals emitted by the devices.

The radio signal emission devices 104(1)-104(N) may include devices that use various wireless communication technologies and radio spectrums to communicate with other devices. For example, the wireless communication technologies may include cellular, Wi-Fi, Bluetooth, license-free two-way radio, and/or so forth. The radios signal emission devices 104(1)-104(N) may include mobile phones, laptop computers, Internet-of-Things (IoT) devices, cellular base stations, Wi-Fi access points, vehicle infotainment systems, two-way radios, and/or so forth. For example, the radio signal emission device 104(1) may be a mobile phone, the radio signal emission device 104(2) may be a Bluetooth device, the radio signal emission device 104(6) may be a laptop computer, and the radio signal emission device 104(N) may be a cellular base station. In operation, the signal intelligence data collected by an RSS device on a radio signal emission device based on its emitted radio signals may include an identifier of the device, a device type of the device, a MAC address of the device, a signal strength measurement (e.g., received signal strength indication (RSSI)) of the radio signal emitted by the device, a signal frequency of the radio signal emitted by the device, a communication encryption protocol used by the device, a number of and device identifiers of client devices that are wirelessly connected to the device, and/or so forth.

The RSS devices 102(1)-102(N) may transmit the collected signal intelligence data 106(1)-106(N) to a backend service in the form of a data collection platform 108. The data collection platform 108 may be executed by one or more computing nodes 110. The data collection platform 108 may store and present the signal intelligence data to authorized users of the data collection platform 108. In some embodiments, the data collection platform 108 may be configured to execute software applications that analyze the signal intelligence data and/or send the data to third-party applications for analysis.

In other embodiments, the data collection platform 108 may be used by the authorized users to remotely instruct an RSS device to activate or deactivate one or more radio transceivers of specific wireless communication technology types as the RSS device is collecting signal intelligence data. In this way, the data collection platform 108 may dynamically change the type of signal intelligence data that is collected by RSS devices after an initial deployment of the devices. In some embodiments, the data collection platform 108 may provide an online user interface portal that is accessible via a web browser or a client application. The online user interface portal may include a user interface page that enables a user to toggle on and off various radio transceivers of an RSS device. For example, the user interface page may be used to initiate the deactivation of all radio transceivers of the RSS device 102(1) that are used to monitor radio signals except for the radio transceiver that is monitoring LTE radio signals so that the device can focus on gathering signal intelligence on cellular radio traffic. Subsequently, the data collection platform 108 may send the corresponding command 112 to the RSS device 102(1).

Furthermore, the data collection platform 108 also be used to remotely configure the software-defined radio of an RSS device such that the radio traffic (e.g., voice traffic) of a radio signal emission device (e.g., a handheld two-way radio) may be monitored and/or recorded. For example, an online user interface page may be used to configure the software-define radio of the RSS device 102(2) to monitor radio traffic carried on specific radio frequency and forward the content of the radio traffic (e.g., voice traffic) to the data collection platform 108. Accordingly, the data collection platform 108 may send the corresponding command 114 to the RSS device 102(2). However, in some embodiments, the software-defined radio may also be manually configured at the RSS device 102(2) using a user interface panel and/or a display of the device.

In additional embodiments, the data collection platform 108 may be used to remotely activate the one or more radio transceivers and/or the software-defined radio of an RSS device to disrupt the wireless communications of radio signal emission devices. Such remote activation may be accomplished using control options presented via a user interface page of the online user interface portal. For example, a radio transceiver of the RSS device 102(4) may be activated to jam radio signals of a specific wireless communication technology and/or radio frequency in the vicinity of the device. In another example, a radio transceiver of the RSS device 102(4) may be activated to emulate a cellular base station such that a radio signal emission device in the form of a cellular phone may connect to the RSS device instead of an actual cellular base station. Thus, following the input of the corresponding instructions via the user interface page, the data collection platform 108 may send the corresponding command 116 to the RSS device 102(4).

In further embodiments, the data collection platform 108 may include an application component that is configured to identify at least one of a hardware vulnerability or a software vulnerability of a radio signal emission device based at least on the received signal intelligence data collected on the radio signal emission device. The information on the hardware or software vulnerabilities may be further presented by the data collection platform to an authorized operator of the platform. In some instances, the hardware vulnerability or the software vulnerability may enable a user of the data collection platform 108 to use a radio transceiver or the software-defined radio of the RSS device to interface with the radio signal emission device to extract, modify, or delete stored data from a memory of the radio signal emission device, write new data to the memory of the radio signal emission device, change configuration settings of the radio signal emission device, and/or perform other tasks that manipulate the radio signal emission device.

Example RSS Device Components

Figure 2:
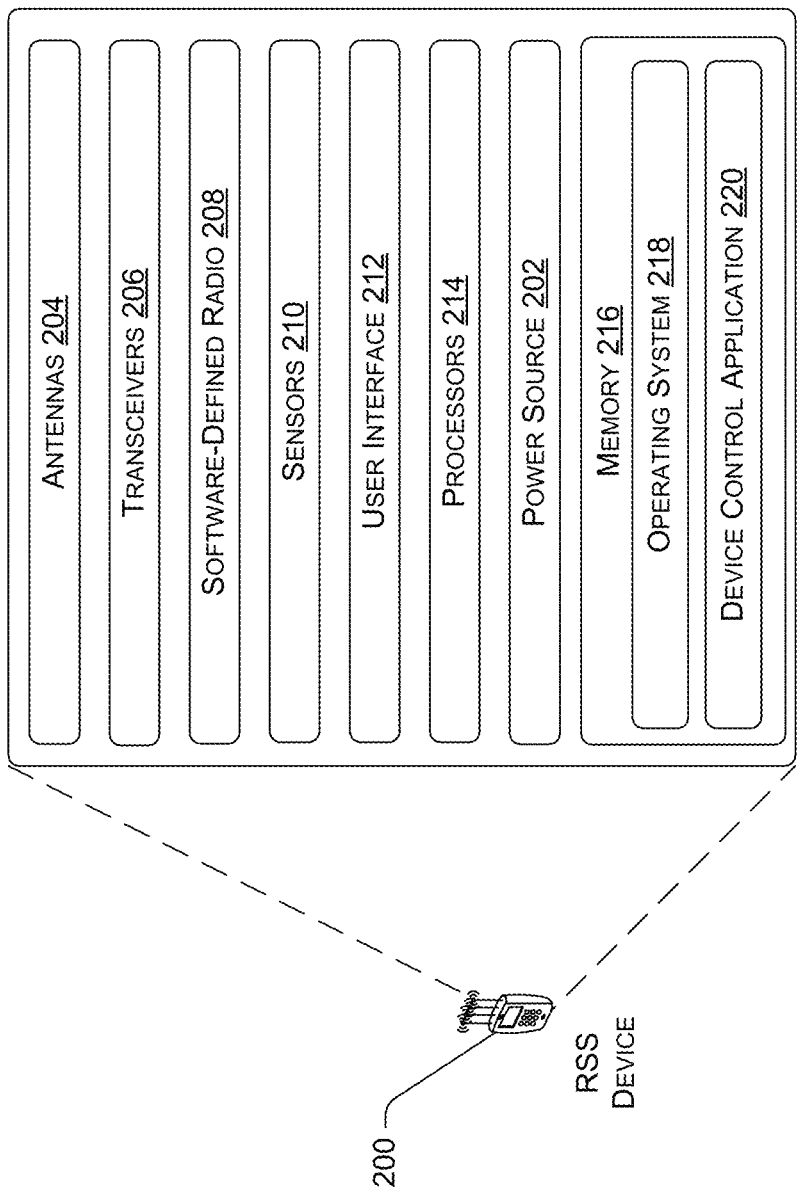
FIG. 2 is a block diagram showing various components of a radio signal surveillance device (RSS device) that is used to collect signal intelligence data from radio signal emission devices in a geographical area for transmission to a data collection platform.

FIG. 2 is a block diagram showing various components of a radio signal surveillance (RSS) device 200 that is used to collect signal intelligence data from radio signal emission devices in a geographical area for transmission to a data collection platform. The RSS device 200 may include a power source 202, antennas 204, radio transceivers 206, software-defined radio 208, sensors 210, processors 214, and memory 216. The power source 202 may include a rechargeable battery that is capable of supplying electrical power to the electrical components of the RSS device. In various embodiments, the battery may be recharged via a charging circuit that is built into the RSS device 200 when the RSS device is connected to external electrical power. For example, the external electrical power may be an AC power source or a DC power source, and the RSS device may be connected to the external electrical power source via an electrical transformer.

The antennas 204 may support the transmission and reception of radio signals via the radio transceivers 206. In various embodiments, the antennas may include a Yagi antenna, a horn antenna, a dish reflector antenna, a slot antenna, a waveguide antenna, a Vivaldi antenna, a helix antenna, a planar antenna, a dipole array antenna, an origami antenna, and/or other types of antennas. In some instances, an antenna may be oriented to point to a particular direction via electrical beamforming and/or via mechanical movement of one or more elements of the antenna by an antenna controller.

The radio transceivers 206 may include multiple cellular radio transceivers, multiple Wi-Fi radio transceivers, multiple Bluetooth radio transceivers, a military band radio transceiver, a software-define radio transceiver, and/or so forth. The various transceivers and the software-defined radio may be configured to send and receive radio signals across a broad radio frequency range (e.g., 70 megahertz to six gigahertz). The cellular radio transceivers may include baseband processors that make use of Subscriber Identification Module (SIM) cards or embedded SIMs. Accordingly, the SIM cards or embedded SIMs may enable the RSS device 200 to register with one or more cellular networks for the purpose of establishing wireless communication connections to the one or more cellular networks. For example, the baseband processor may transmit an electronic identifier (integrated circuit card identifier (ICCID), IMSI, etc.) contained in a SIM card or embedded SIM to a cellular network. In turn, the cellular network may use the electronic identifier to register the RSS device 200 with the network and provide communication services to the RSS device 200.

The presence of multiple radio transceivers of the same communication technology may enable an RSS device to simultaneously use multiple radio transceivers of the same communication technology type to collect signal intelligence data and communicate with a backend service, e.g., transmit the collected signal intelligence data to a backend server. For example, the RSS device may use a first cellular radio transceiver to collect signal intelligence data on LTE radio traffic of radio signal emission devices while simultaneously use a second cellular radio transceiver to transmit the collected signal intelligence data to the backend server. Each of the radio transceivers may be supported by associated communication software that enables the transceiver to receive and send data via the corresponding communication protocol for the wireless communication technology type of the transceiver.

The software-defined radio 208 may include electrical components, e.g., processors (e.g., central processing units (CPUs)), analogy-to-digital converters (ADCs), digital-to-analogy converters (DACs), field programmable gate arrays (FPGAs), application-specific integrated circuits (ASICs), and/or so forth that are controllable by a software application to adaptably perform wireless communication, i.e., receive and transmit radio signals, using various communication frequencies, signal modulation technologies, radio access technologies, and/or communication protocols. Accordingly, the software-defined radio 208 may be dynamically configured to receive and send radio signals on various licensed and unlicensed radio frequencies. In various embodiments, the operations of the radio transceivers and the software-defined radio 208 may be further supported by additional device hardware, such as hardware decoders and encoders, a network interface controller, a universal serial bus (USB) controller, and/or other signal processing and communication components. In some embodiments of the RSS device 200, the hardware may include additional hardware interface, data communication, or data storage hardware.

The sensors 210 may include a compass, an accelerometer, and/or a global positioning system (GPS) sensor. The compass, the accelerometer, and the GPS sensor may detect orientation, movement, and geolocation of the RSS device 200. The user interfaces 212 may include one more data output components (e.g., a visual display, an audio speaker), and one or more data input components. The data input components may include, but are not limited to, combinations of one or more of keypads, touch screens, and/or so forth.

The processors 214 may include a single-core processor, a multi-core processor, a complex instruction set computing (CISC) processor, or another type of processor. The memory 216 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 214 and the memory 216 may implement an operating system 218. In turn, the operating system 218 may provide an execution environment for a device control application 220. The operating system 218 may include components that enable the RSS device 200 to receive and transmit data via various interfaces (e.g., user controls, radio transceivers, software-defined radio, and/or memory input/output devices), as well as process data using the processors 214 to generate output. The operating system 218 may include a presentation component that presents the output (e.g., display the data on an electronic display, store the data in memory, transmit the data to another electronic device, etc.). Additionally, the operating system 218 may include other components that perform various additional functions generally associated with an operating system.

The device control application 220 may control the radio transceivers and the software-define radio to collect signal intelligence data on radio signal emission devices, such as the radio signal emission devices 104(1)-104(N), that are in the vicinity of the RSS device 200, as well as transmit the signal intelligence data to the data collection platform 108. In various embodiments, the device control application 220 may direct a radio transceiver or the software-defined radio to capture the radio signals emitted by a radio signal emission device. The information encapsulated in the radio signals captured by the radio transceiver, or the software-defined radio, may be further deciphered by the communication software associated with the radio transceiver or the software-defined radio. The information may be deciphered into signal intelligence data according to the communication protocol used by the transceiver or the software-defined radio. For example, the signal intelligence data collected by the RSS device 200 on each radio signal emission device based on its emitted radio signals may include an identifier of the device, a device type of the device, a MAC address of the device, a signal strength measurement (e.g., RSSI) of the radio signal emitted by the device, a signal frequency of the radio signal emitted by the device, a communication encryption protocol used by the device, a number of and device identifiers of client devices that are wirelessly connected to the device, and/or so forth. The device control application 220 may send the signal intelligence data to the data collection platform 108 as packet capture data, e.g., in PCAP format. In some embodiments, the device control application 220 may receive user inputs via the user interface 212 for activating or deactivating one or more radio transceivers of specific wireless communication technology types in the RSS device 200. In turn, the device control application 220 may activate a radio transceiver by directing the radio transceiver to be energized with electrical power or deactivate a radio transceiver by directing the radio transceiver to be de-energized, i.e., turn off electrical power to the radio transceiver in accordance with the user inputs received via the user interface 212.

In other embodiments, the device control application 220 may activate or deactivate one or more radio transceivers of specific wireless communication technology types based on commands from the data collection platform 108. In this way, the data collection platform 108 may dynamically change the type of signal intelligence data that is collected by the RSS device 200 after an initial deployment of the device.

In additional embodiments, the device control application 220 may receive instructions from the data collection platform 108 for configuring a software-defined radio of the RSS device 200. For example, the instructions may direct the device control application 220 to configure the software-defined radio to monitor for radio signals of a specific communication frequency, a specific signal modulation technology, a specific radio access technology, and/or a specific communication protocol. In turn, the device control application 220 may implement the instructions with respect to the software-defined radio to monitor the specific radio traffic and relay the radio traffic to the data collection platform 108. However, in some embodiments, the software-defined radio may be further configured to monitor for specific radio signals at the device using the user interface 212.

The device control application 220 may direct the radio transceivers of the RSS device 200 to use various wireless communication technologies and radio spectrums to communicate with the data collection platform 108. Such wireless communication technologies may include cellular, Wi-Fi, Bluetooth, military-specific wireless communication technologies (e.g., Single Channel Ground and Airborne Radio System (SINCGARS), AN/PRC-148, etc.), and/or so forth. Accordingly, the RSS device 200 may establish communication links with network access nodes of various wireless communication technologies. For example, a network access node may be a cellular base station, a Wi-Fi router, a Bluetooth access point, or a military radio band base station. Each of the network access nodes may be linked to the computing nodes 110 that host the data collection platform 108 via a backhaul network that provides a network path to the platform. In various embodiments, the backhaul network may include publicly accessible network elements of a cellular network, a local access network (LAN), a wide-area network, and/or the Internet. The communications between the RSS device 200 and the computing nodes 110 of the data collection platform 108 may be encrypted via an encryption algorithm to ensure data security. For example, the communication may be encrypted using the secure shell protocol (SSH) or some other comparable encryption protocol. The encryption protocol may include the device control application device 220 and the data collection platform 108 using public-private key pairs to mutually authenticate to each other to establish a secure communication channel.

In some embodiments, the device control application 220 may be configured to use the network access nodes of various wireless communication technologies in a hierarchical manner. In this way, the device control application 220 may initially use a network access node of a most preferred wireless communication technology, and then use one or more less preferred wireless communication technologies in a failover manner when network access nodes of more preferred wireless communication technologies are unavailable. For example, the device controller application 220 may be configured to use an available military radio band access node, then an available cellular network access node, then an available Wi-Fi access node, then an available Bluetooth network access node in order of preference, in which the cellular network access node is the most preferred and the Bluetooth network access node is least preferred.

In some embodiments, a military radio band network access node may be another RSS device or other military communication radio device that has a network path to the data collection platform 108. In such embodiments, if the RSS device 200 does not have a direct network path to the data collection platform 108 (e.g., lacks a connection to a military radio network base station that communicatively links to the platform), the device control application 220 may configure the RSS device 200 to form an ad-hoc military radio band mesh network with one or more other RSS devices that do have a network path to the platform. In this way, as long as one of the devices in the mesh network has a network pathway to the data collection platform 108, the RSS device 200 may send signal intelligence data to the platform. In such instances, when the device control application 220 determines that the RSS device 200 is unable to connect to a military radio network base station that communicatively links to the platform, the device control application 220 may use the military radio band radio transceiver to look for other military radio band devices, such as another RSS device, that have links to the platform. Once such a device is found, the device control application 220 may use its device credential (e.g., device identifier, digital identity certificate, etc.) to authenticate the RSS device 200 to the military radio band network access node with the network path to the platform. Following the validation of the device credentials of the RSS device 200 by the access node, the military radio band network access node may act as a relay node to relay communications between the RSS device 200 and the data collection platform 108. In some instances, the device control application 220 may also authenticate military radio band network access node by requesting the device credentials of the node and validating that the device credentials match the device credentials of authorized devices stored in the memory 216 of the device.

On the other hand, if the RSS device 200 does have a network path to the data collection platform 108, the RSS device 200 may act as a relay node for other RSS devices. For example, the device control application 220 may cause the military radio band radio transceiver to broadcast an indication that the RSS device 200 has an active communication link to the data collection platform 108 when the RSS device 200 receives a link query from another RSS device. When the other RSS device attempts to establish an ad-hoc communication link with the RSS device 200, the device control application 220 may validate the device credentials of the other RSS device. Such validation may be performed using valid device credentials stored in the memory 216 of the RSS device 200 or by sending the device credentials of the other RSS device to the data collection platform 108 for validation. Following the validation of the device credentials of the other RSS device, the device control application 220 may configure the RSS device 200 to act as a relay node to relay communication between the other RSS device and the platform. In some instances, the RSS device 200 may act as a relay node when the device credentials of the RSS device 200 transmitted by the device control application 220 to the other RSS device have been validated by the other RSS device as well.

In additional embodiments, the device control application 220 may receive commands that activate the one or more radio transceivers and/or the software-defined radio of an RSS device to disrupt the wireless communications of radio signal emission devices. For example, a command may include instructions regarding the radio transceiver of the specific wireless communication technology to activate. In another example, a command may include instructions configuring the software-defined radio to broadcast a radio jamming signal using at specific communication frequency, via a specific signal modulation technology, a specific radio access technology, and/or a specific communication protocol. Accordingly, a radio transceiver or the software-defined radio of the RSS device 200 may be activated to jam radio signals of a specific wireless communication technology and/or radio frequency in the vicinity of the device. In other embodiments, the device control application 220 may receive a command that activates a radio transceiver of the RSS device 200 to emulate a cellular base station such that a radio signal emission device in the form of a cellular phone may connect to the RSS device instead of an actual cellular base station. For example, the RSS device 200 may be directed to broadcast a cellular signal that is stronger than a cellular signal that is broadcast by a cellular base station that is operating in an area. Following the connection of the cellular phone to the RSS device 200, the RSS device 200 may act as a man-in-the middle node that relays radio traffic between the cellular phone and the cellular base station. In this way, the RSS device 200 may intercept the data traffic communicated between the cellular phone and the cellular base station for transmission to the data collection platform 108.

Example Data Collection Platform Components

Figure 3:
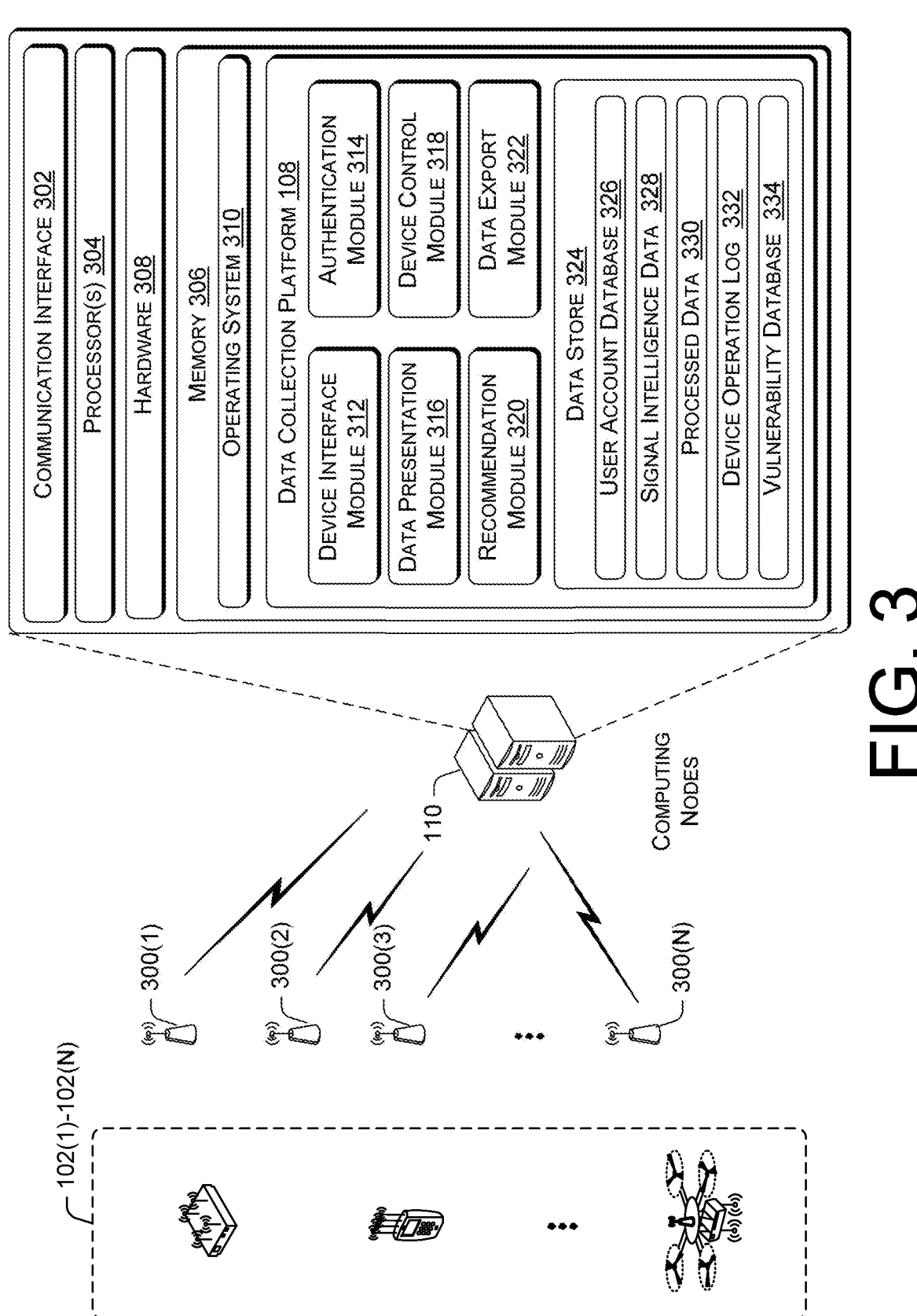
FIG. 3 is a block diagram showing various components of a data collection platform that receives signal intelligence data on radio signal emission devices in a geographical area.

FIG. 3 is a block diagram showing various components of a data collection platform that receives signal intelligence data on radio signal emission devices in a geographical area. The data collection platform 108 may be executed by the one or more computing nodes 110. The computing nodes 110 may include general-purpose computers, servers, or other electronic devices that are capable of receiving inputs, processing the inputs, and generating output data. In other embodiments, the computing nodes 110 may be virtual computing devices in the form of virtual machines or software containers that are hosted in a cloud.

The computing nodes 110 may include a communication interface 302, one or more processors 304, memory 306, and hardware 308. The communication interface 302 may include wireless and/or wired communication components that enable the computing nodes 110 to transmit data to and receive data from other networked devices. The hardware 308 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 304 and the memory 306 of the computing nodes 110 may implement an operating system 310. In turn, the operating system 310 may provide an execution environment for the data collection platform 108. The operating system 310 may include components that enable the computing nodes 110 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The data collection platform 108 may include a device interface module 312, an authentication module 314, a data presentation module 316, a device control module 318, a recommendation module 320, and a data export module 322. The modules may include routines, program instructions, objects, and/or data structures that perform particular tasks or implement particular abstract data types. The memory 306 may also include a data store 324 that is used by the data collection platform 108.

The device interface module 312 may receive signal intelligence data from the RSS devices 102(1)-102(N). In various embodiments, in order to transmit the signal intelligence data to the data collection platform 108, the RSS devices 102(1)-102(N) may connect to various network access nodes that have network paths to the computing nodes 110. For example, the network access nodes may include a military radio band base station 300(1), a cellular base station node 300(2), a Wi-Fi access point node 300(3), a Bluetooth access point node 300(N). The device interface module 312 may establish an encrypted communication channel on the network path that connects each RSS device to the computing nodes 110. For example, the communication channel may be encrypted using SSH or another comparable encryption protocol. The encryption protocol may include an RSS device and the device interface module 312 using public-private key pairs to mutually authenticate to each other to establish a secure communication channel. The encrypted communication channels may be used by the RSS devices 102(1)-102(N) to send the signal intelligence data to the device interface module 312 as packet capture data, e.g., in PCAP format. In turn, the device interface module 312 may store the received signal intelligence data, i.e., signal intelligence data 328, in the data store 324.

In some embodiments, a network path that connects an RSS device to the computing nodes 110 may include a software-defined traffic routing mesh network that utilizes secure private network connections, such as virtual private networks (VPNs) connections, and a high availability (HA) mesh topology to route network data traffic between the RSS device and the computing nodes 110. Accordingly, incoming and outgoing network data traffic from the data collection platform 108 may be obfuscated so that the network data traffic originating from the data collection platform 108 may appear to come from a network location that is different from the actual network location of the data collection platform 108. For example, the software-defined traffic routing mesh network may include exit network nodes to the Internet that provide points of presence (POP) at various locations around the world, such that the network infrastructure behind the network data traffic and the origins of network data traffic are obfuscated from a monitoring entity. Furthermore, the use of POP at various locations may enable network data traffic from the data collection platform 108 to blend in with local network data traffic at the various locations, thereby further obfuscating sensitive network data traffic from the attention of the monitoring entities. An example of the software-defined traffic routing mesh network is shown in FIG. 4.

Figure 4:
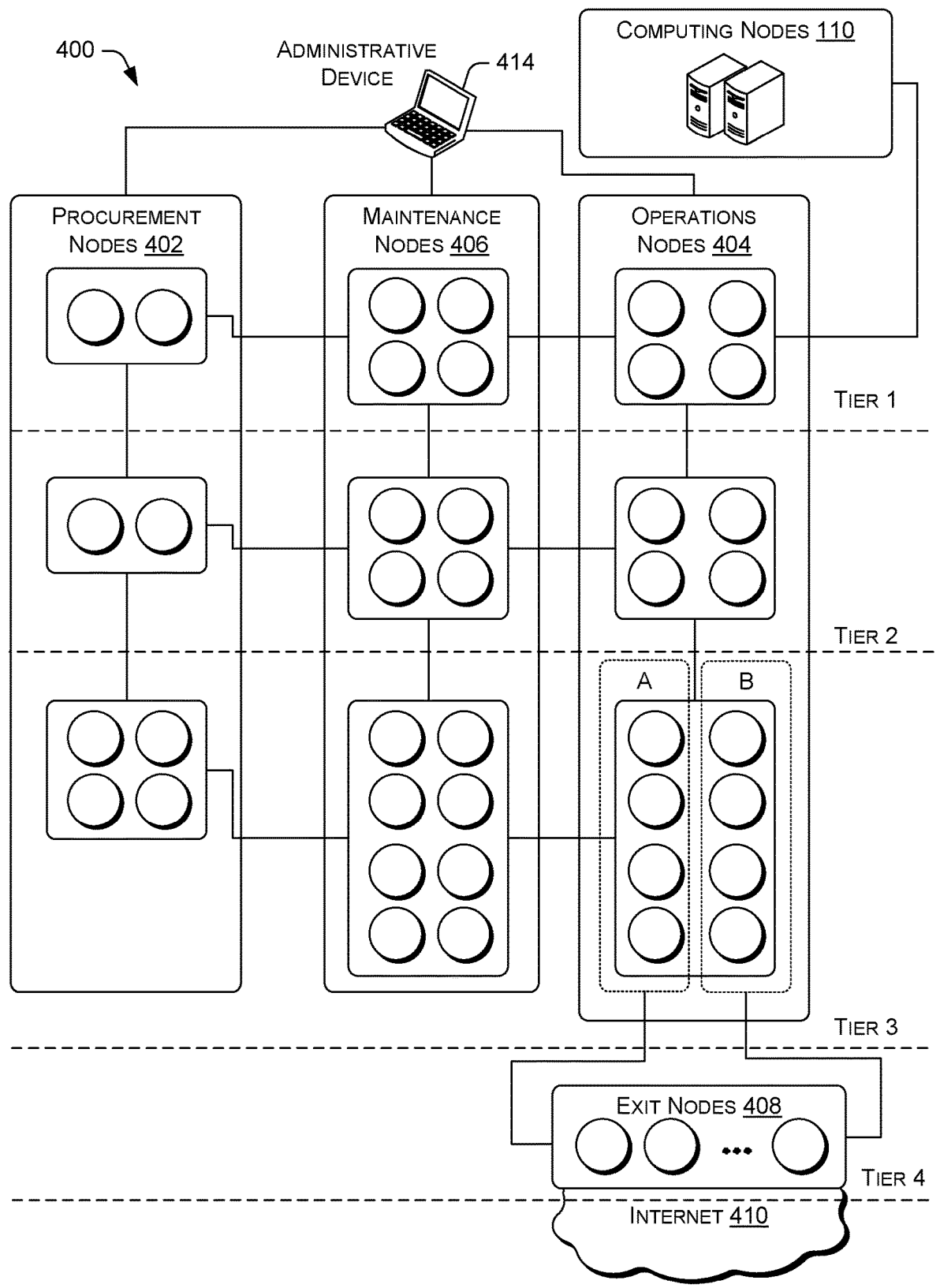
FIG. 4 illustrates an example architecture of a software-defined mesh network that is included in a network path between an RSS device and a data collection platform.

As shown in FIG. 4, the mesh network 400 may include multiple network nodes that are deployed into multiple tiers. For example, the mesh network 400 may include a total of four tiers. Furthermore, there are three different types of network nodes in each tier of the first three tiers, in which each type of network node performs a different set of corresponding functions within the mesh network 400. These different types of network nodes may include procurement network nodes 402, operations network nodes 404, and maintenance network nodes 406. The fourth tier of the mesh network 400 may include multiple exit network nodes 408 that serve as network connection points for the mesh network 400 to connect to an external network, such as the Internet 410. As illustrated in the example architecture, each of the network nodes in the mesh network 400 is represented by a corresponding circle.

The procurement network nodes 402 may be used to acquire the hardware components and/or software components for the creation of various network nodes during an initial deployment of the mesh network 400. The operations network nodes 404 are configured to route network data traffic between one or more computing nodes 110 and the exit network nodes 408. The one or more computing nodes 110 may include computing devices that are used to access various websites and online services available from the Internet. For example, such computing devices may include smartphones, laptops, desktop computers, servers, Internet-of-Things (IoT) devices, and/or so forth. The one or more computing nodes 110 may connect to the mesh network 400 via one or more operations networks node in the first tier of the mesh network 400. Accordingly, incoming and outgoing network data traffic of a client device may be routed through a series of operations network nodes in the multiple tiers of the mesh network 400 to an exit network node via a secure private network channel to ensure private point-to-point data routing. In various embodiments, such a secure private channel may be formed using multiple virtual private network (VPN) connection hops between the operations network nodes in the multiple tiers. Further, since the exit network nodes may be located anywhere around the world, they may provide customized attribution to the network data traffic. For example, if one of the computing nodes 110 is used to conduct a web search using a web search engine and the web search is routed through a particular exit network node of the exit network nodes 408 to the Internet, the IP address and/or other digital signature information of the client device are not observable to the web search engine. Instead, only the digital signature information (e.g., IP address, virtual machine (VM) information, etc.) related to the exit network node are observed by the web search engine.

The maintenance network nodes 406 may be used to perform maintenance services for the other network nodes. Such maintenance services may include configuration of the operations network nodes 404 and/or the procurement network nodes 402, monitoring and logging of network activities that transited through the operations network nodes 404 and/or the procurement network nodes 402, emergency access to the operations network nodes 404 and/or the procurement network nodes 402, and/or so forth.

Each of the network nodes may include hardware components and software components that are implemented to perform the various tasks assigned to each network node. In various embodiments, each network node may include a hardware component, such as a computing device that is configured to execute software applications and interact with other computing devices of the other network nodes, an administrative device 414 of the mesh network provider, etc. In various embodiments, the administrative device 414 may be a laptop, a desktop computer, a server, or any other real or virtual computing device that is used by the provider to configure and manage the entire software-defined traffic routing mesh network. Each network node may be configured with a software component, such as software applications and/or third-party software services (e.g., hypervisors, virtual machines, containers, etc.) that enable the network node to perform its assigned tasks. For example, the network nodes may be implemented using software services that are provided by virtual private server (VPS) providers, a cloud computing service providers, internet service providers (ISPs), and/or so forth. In the case of operations network nodes 404, such software service may enable the executions of applications that implement secure private network connections, e.g., VPN connections using a secure network protocol, e.g., IPSec, OpenVPN, etc., to route incoming and outgoing network data traffic of the one or more computing nodes 110 through the tiers of the mesh network. Furthermore, the hardware component and/or software component of an operations network node may be further used to execute applications that modify the metadata of network data traffic that passes through the node. For example, metadata identifying the language packs, web browsers, and/or operating systems associated with network data traffic from a client device may be substituted with alternative metadata as the network data traffic is routed through the node.

Returning to FIG. 3, the authentication module 314 may enable a user to create or submit login credentials to establish a user account with the data collection platform 108. The login credentials may include a user identifier, a user password, user biometric data, and/or so forth. The login credentials and other user registration information may be stored by the authentication module 314 in a user account database 326. Subsequently, the authentication module 314 may use the information stored in the user account database 326 to grant or deny user access to the online user interface portal. For example, the authentication module 314 may receive an input of login credentials via a login page of the online user interface portal and grant the user access when the inputted login credentials are validated against the information stored in the user account database 326. In some embodiments, an authorized user may use a user account that is associated with a virtual persona to interact with the data collection platform 108. The virtual persona may comprise a set of features or attributes that a real human being focuses on to identify characteristics about a person, whether real or virtual. In some embodiments, the virtual persona may be related to a class of people with expected traits and behaviors (e.g., an employee of a private company in New York, a retired person in California, etc.). For example, in a software specification, a virtual persona may be defined as part of specifying user classes and scenarios that people represented in the user class will perform. In the case of online presences, a virtual persona may include a set of self-consistent attributes that accurately represent a desired class of person. Accordingly, the authorized user may provide login credentials and user registration information to the authentication module 314 that are consistent with the virtual persona.

The data presentation module 316 may use the signal intelligence data received from one or more RSS devices to generate visual representations that illustrate the geolocations and radio signal characteristics of detected radio signal emission devices. The visual representation may be generated by the data presentation module 316 for display to authorized users via an online user interface portal. The online user interface portal may include one or more web pages that enable an authorized user to submit input that configures the information presented via a display, request particular data to be presented via the display, direct the RSS devices to perform specified tasks, and/or so forth. For example, the web pages may be in the form of HyperText Markup Language (HTML) documents, in which the documents may include text content, images, multimedia content, cascade style sheets (CSS), and/or scripts. The data presentation module 316 may use an application server that supports server-side scripting via multiple scripting languages, such as Active Server Pages (ASP), Hypertext Preprocessor (PHP), JavaScript, and other scripting languages to support the dynamic generation of web pages based on user inputs. Accordingly, the web portal may be accessible via a web browser or a client application on a user device.

In various embodiments, the online user interface portal may include user controls that enable an authorized user to select the information to be presented via a display. For example, the user controls may be used to select digital maps of geographical areas, zoom in or zoom out on the selected digital maps of geographical areas, display calculated locations of RSS devices that are in a selected geographical area, display signal intelligence data of radio signal emission devices that are in a geographical area, display signal intelligence data of radio signal emission devices that use specific wireless communication technologies for display, and/or so forth.

In such embodiments, the location of each radio signal emission device may be calculated using radio signal strength data (e.g., RSSIs) that is obtained by one or more RSS devices that are in the vicinity of the radio signal emission device. For example, the data presentation module 316 may apply various radio signal direction finding and radio signal triangulation algorithms to the radio signal strength data of the radio signal emission device to compute a relative distance and relative bearing of the device to each of the one or more RSS devices. Accordingly, since the locations of the one or more RSS devices are known from their GPS sensors, the data presentation module 316 may use the relative distance and relative bearing data to compute the location of the radio signal emission device. In some embodiments, the data presentation module 316 may further use a confidence calculation algorithm to calculate one or more confidence level values for the location of the radio signal emission device as derived using the radio signal strength data provided by one more RSS devices for the radio signal emission device. For example, the confidence level values may be calculated for various compass directions that center on a location of an RSS device or center on a location that is an approximate geographical central point in relation to the locations of multiple RSS devices that provided the radio signal strength data for the radio signal emission device.

Thus, the one or more confidence level values may indicate the certainty as to whether the radio signal emission device is actually located at the computed location for the radio signal emission device. For example, the calculated confidence level values may be higher when the radio signal strength data includes data collected by two or more RSS devices, and the calculated confidence level values may be lower when the radio signal strength data includes data that is collected by a single RSS device. The computed location and the calculated confidence level values may be presented by the data presentation module 316 on a digital map of a corresponding geographical area. Furthermore, the data presentation module 316 may recompute the locations and recalculate the confidence level values of radio signal emission devices for presentation as the RSS devices move around various geographical areas. The data presentation module 316 may store the computed locations and the calculated confidence level values for the radio signal emission device as processed data 330 in the data store 324.

In other embodiments, the data presentation module 316 may receive instructions that are inputted by an authorized user via the online user interface portal for activating or deactivating one or more radio transceivers of specific wireless communication technology types of an RSS device as the RSS device is collecting signal intelligence data. Accordingly, the data presentation module 316 may pass the instructions to the device control module 318. In turn, the device control module 318 may translate the instructions into a corresponding command and direct the device interface module 312 to send the command to the RSS device. Likewise, the data presentation module 316 may receive instructions that are inputted by an authorized user via the online user interface portal for configuring the software-defined radio of an RSS device such that the radio traffic (e.g., voice traffic) of a radio signal emission device (e.g., a handheld two-way radio) may be monitored and/or recorded. Accordingly, the data presentation module 316 may pass the instructions to the device control module 318. In turn, the device control module 318 may translate the instructions into a corresponding command and direct the device interface module 312 to send the command to the RSS device.

Additionally, the data presentation module 316 may receive instructions that are inputted by an authorized user via the online user interface portal for remotely activating the one or more radio transceivers and/or the software-defined radio of an RSS device to disrupt the wireless communications of a radio signal emission device. Accordingly, the data presentation module 316 may pass the instructions to the device control module 318. In turn, the device control module 318 may translate the instructions into a corresponding command and direct the device interface module 312 to send the command to the RSS device. In various embodiments, the data presentation module 316 may store the various inputted instructions by the authorized users and commands that are transmitted to the RSS devices in a device operation log 332 that is stored in the data store 324.

The recommendation module 320 may identify at least one of a hardware vulnerability or a software vulnerability of a radio signal emission device based at least on the received signal intelligence data collected on the radio signal emission device. For example, the recommendation module 320 may use the device identification information of a radio signal emission device as extracted from signal intelligence data to lookup hardware and/or software vulnerabilities of the device from a vulnerability database 334 stored in the data store 324. The vulnerability database 334 may be periodically updated with new vulnerability information as the information become available. In some instances, the hardware vulnerability or the software vulnerability may enable a radio transceiver or a software-defined radio of an RSS device to exploit such vulnerabilities by interfacing with a radio signal emission device to extract, modify, or delete stored data from a memory of the radio signal emission device, write new data to the memory of the radio signal emission device, change configuration settings of the radio signal emission device, and/or perform other tasks that manipulate the radio signal emission device. Accordingly, the recommendation module 320 may present information on one or more exploits that take advantage of the vulnerabilities and/or user interface controls for initiating such exploits on the radio signal emission devices with such vulnerabilities. Thus, an authorized user may input instructions via the user interface controls for a radio transceiver or a software-defined radio of an RSS device to initiate an exploit against a radio emission device.

The data export module 322 may include an application program interfaces (APIs) that can be called upon by other software applications to access the data stored in the data store 324, such as the signal intelligence data 328, the processed data 330, and/or so forth. In various embodiments, the data export module 322 may employ the file transfer protocol (FTP), the Hypertext Transfer Protocol (HTTP), direct network infrastructure element connection, and/or other data transfer techniques to transfer the data to the other software applications. The data that is transferred by the data export module 322 may be in text format, JavaScript Object Notation (JSON format), comma-separated values (CSV) format, or some other file format. As examples, the other software applications may include applications that use machine-learning algorithms to determine behavior patterns of the radio signal emission devices and/or predict future behaviors of the radio signal emission devices.

Example Data Collection Platform Interfaces

Figure 5:
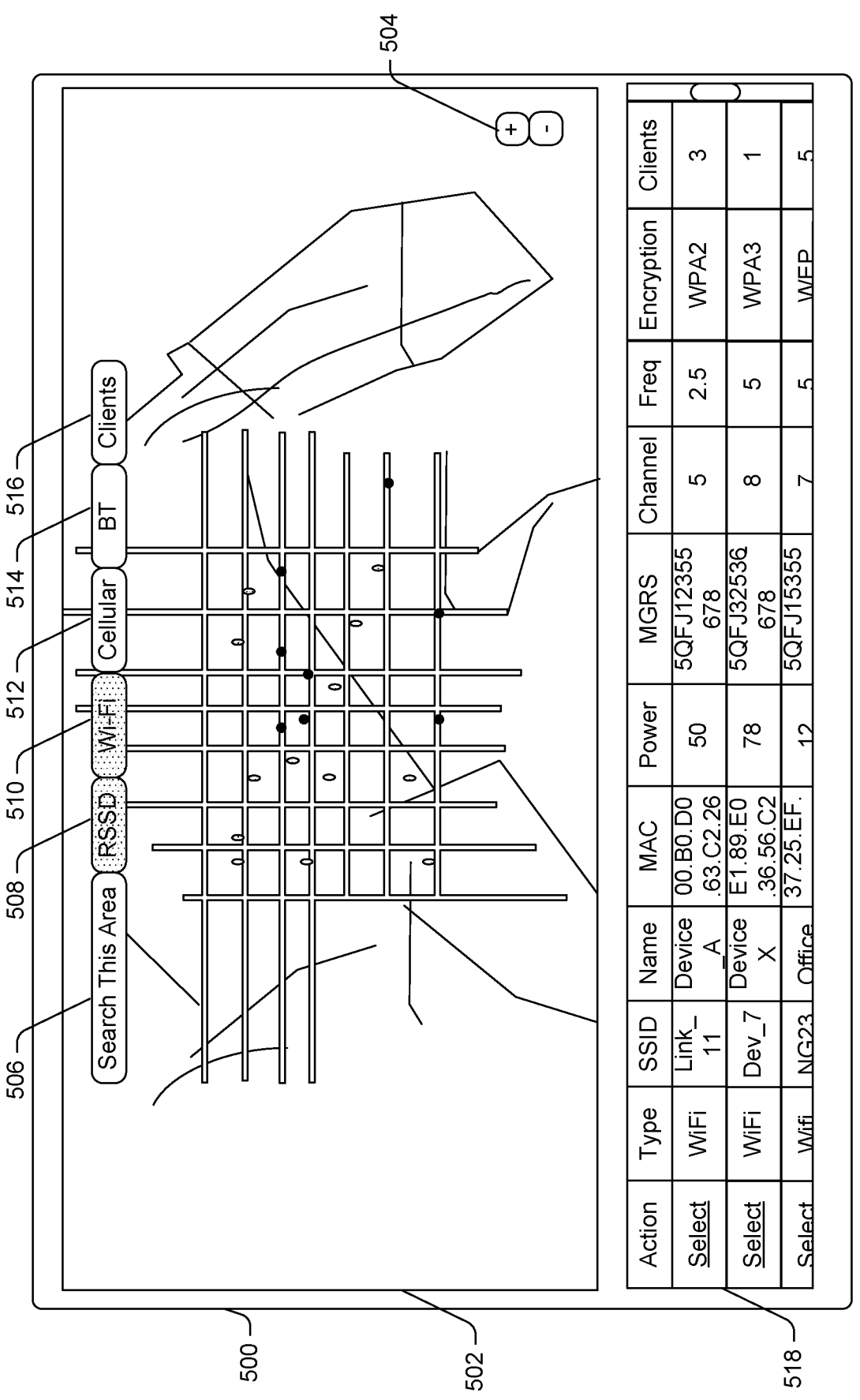
FIG. 5 illustrates an example interface for selecting signal intelligence data of the radio signal emission devices in an area for viewing.

FIG. 5 illustrates an example interface 500 for selecting signal intelligence data of the radio signal emission devices in an area for viewing. The example interface 500 may be presented by the data collection platform 108 following the collection of signal intelligence data by RSS devices in a geographical area. The example interface 500 includes a first user interface area 502 that shows a digital map of a geographical area of interest. The digital map is equipped with digital map controls 504 for zooming in and zooming out on the digital map. The first user interface area 502 is further equipped with a search option 506, an RSS device option 508, a Wi-Fi option 510, a cellular option 512, a Bluetooth option 514, and a client option 516. The search option 506 may be selected to search a particular geographical area that is shown via the digital map for radio signal emission devices. The RSS device option 508 may be toggled on and off to display or hide the locations of one or more RSS devices in the particular geographical area. The Wi-Fi option 510 may be toggled on and off to display or hide the locations of Wi-Fi access points in the particular geographical area that are detected by the one or more RSS devices. Likewise, the cellular option 512 may be toggled on and off to display or hide the locations of cellular devices (e.g., smartphones and/or cellular base stations) in the particular geographical area that are detected by the one or more RSS devices. Additionally, the Bluetooth option 512 may be toggled on and off to display or hide the locations of Bluetooth devices in the particular geographical area that are detected by the one or more RSS devices. The client option 516 may be toggled on and off to display or hide the locations of one or more client devices that are attached to other detected devices, such as Wi-Fi devices (e.g., laptops) that are attached to a Wi-Fi access point.

The example interface 500 may further include a second user interface area 518 that shows device information of the radio signal emission devices in the particular geographical area that are detected by the one or more RSS devices. For example, the second user interface area 518 may show a list of such radio signal emission devices, in which the device information displayed for each device includes a device type of the device, an SSID of the device, a name of the device, a MAC address of the device, a signal strength value (e.g., RSSI) of the device, location coordinates (e.g., Military Grid Reference System (MGRS) coordinates) of the device, a radio channel used by the device, a radio frequency used by the device, a communication encryption protocol used by the device, device identifiers of one or more client devices that are wirelessly connected to the device, and/or so forth. In some embodiments, each device listed in the second user interface area 518 may have a corresponding selection control. The selection control may be activated to access additional user interface options for performing additional tasks with respect to a corresponding device, such as viewing additional information on the device, jam the radio signals of the device, emulate the device, and/or so forth.

Figure 6:
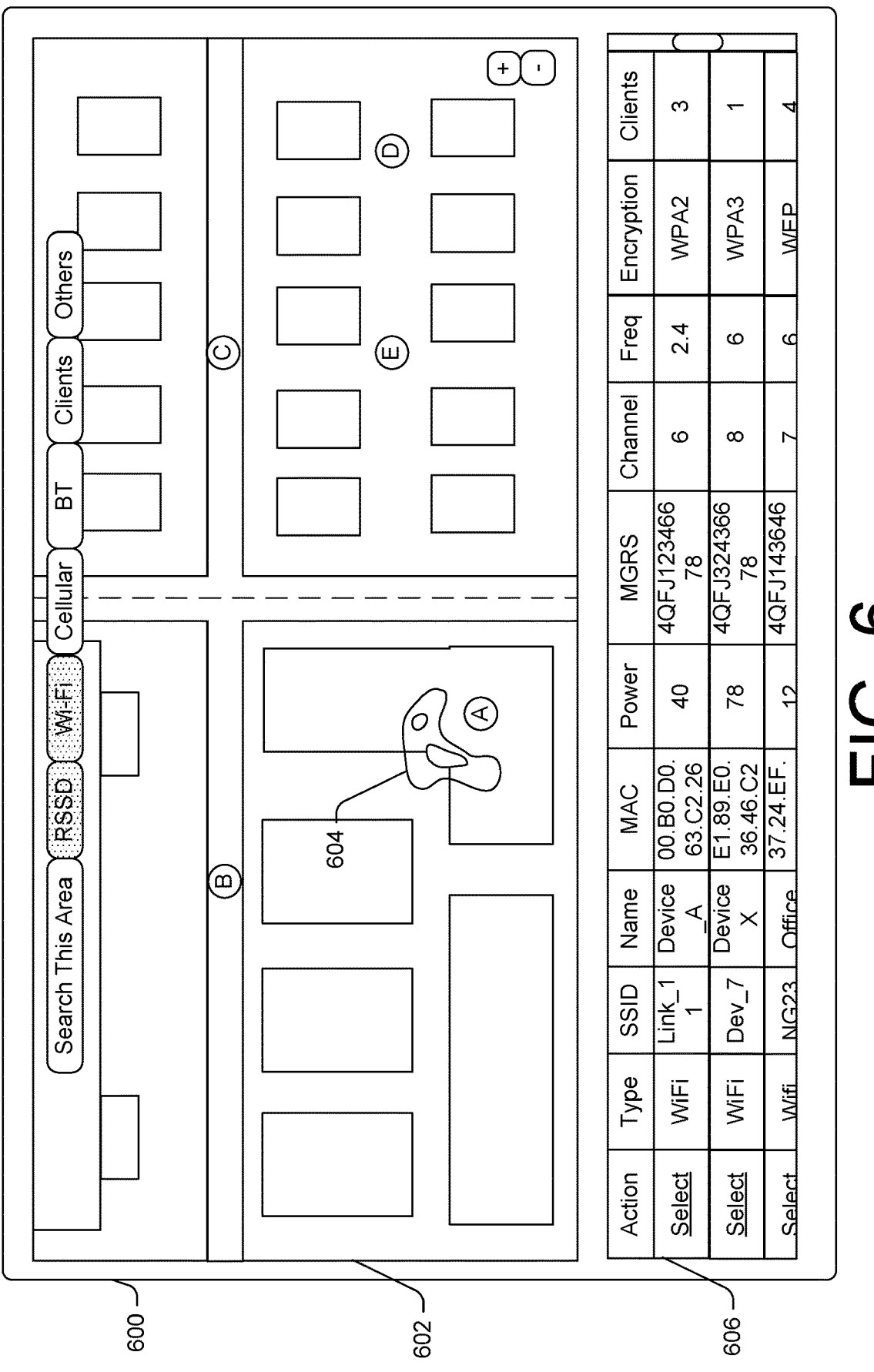
FIG. 6 illustrates an example interface for viewing signal intelligence data of the radio signal emission devices in an area.

FIG. 6 illustrates an example interface for viewing signal intelligence data of the radio signal emission devices in an area. The example interface 600 may be presented by the data collection platform 108 following the collection of signal intelligence data by RSS devices in a geographical area. The example interface 600 includes a first user interface area 602 that shows a digital map of a geographical area of interest. The first user interface area 602 may include similar controls as the first user interface area 502 of the example interface 500. As shown, the digital map may show the calculated locations of RSS devices (e.g., RSS devices A, B, C, D, and E) in relation to geographical features and/or landmarks. In some instances, the digital map may further show the approximate location of a radio signal emission device as a contour blob 604. The contour blob 604 may be generated based on the confidence level values computed for the calculated location of the radio signal emission device. Thus, the contour blob 604 may encompass an area in which the radio signal emission device may be located. The size and the shape of the contour blob 604 may change as the RSS devices move around the radio signal emission device and the confidence level values increase or decrease due to changes in the radio signal strength detected by the RSS devices. Thus, in some instances, the operators and/or vehicles carrying RSS devices may be directed to move around a geographical area until the size, shape, and/or area of the contour blob 604 falls under one or more corresponding thresholds that indicate an acceptable confidence level for the location of the radio signal emission device. Additionally, the example interface 600 may further include a second user interface area 606 that shows device information of the radio signal emission devices in the particular geographical area that are detected by the one or more RSS devices in a similar manner as the second user interface area 518 of the example interface 500.

Example Processes

FIGS. 7-11 present illustrative processes 700-1100 for using for using RSS devices to collect signal intelligence data on radio signal emission devices in a geographical area for presentation via a data collection platform. Each of the processes 700-1100 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 700-1100 are described with reference to the architecture 100 of FIG. 1.

FIG. 7 is a flow diagram of an example process 700 for receiving signal intelligence data on one or more radio signal emission devices at a data collection platform from one or more RSS devices. At block 702, the data collection platform 108 may receive signal intelligence data on one or more radio signal emission devices from one or more RSS devices. The radios signal emission devices may include mobile phones, laptop computers, Internet-of-Things (IoT) devices, cellular base stations, Wi-Fi access points, vehicle infotainment systems, two-way radios, and/or so forth. The RSS devices may have multiple form factors, such as a handheld portable device, a body-worn device that can be worn on the body of a person, a vehicle mountable device, an airborne device that is mounted on a UAV.

At block 704, the data collection platform 108 may present the signal intelligence data on the one or more radio signal emission devices for analysis. In various embodiments, the signal intelligence data may be presented via an online user interface portal that shows the locations of the one or more radio signal emission devices on a digital map, as well as the device information of the one or more radio signal emission devices. The analysis may be performed by one or more authorized users of the data collection platform 108.

At block 706, the data collection platform 108 may export the signal intelligence data on the one or more radio signal emission devices to one or more software applications for analysis. For example, the software applications may include applications that use machine-learning algorithms to determine behavior patterns of the radio signal emission devices and/or predict future behaviors of the radio signal emission devices. At block 708, the data collection platform 108 may receive instructions to activate or deactivate one or more radio transceivers of at least one wireless communication technology type on at least one of the one or more RSS devices to refine the signal intelligence being gathered. The instructions may be inputted by an authorized user via the online user interface portal of the data collection platform 108. The different wireless communication technology types may include cellular, Wi-Fi, Bluetooth, and/or so forth. At block 710, the data collection platform may command the at least one RSS device to activate or deactivate the one or more radio transceivers of at least one wireless communication technology according to the instructions. The command may be sent to each RSS device via a corresponding wireless network access node that provides a network connection between the RSS device and the data collection platform 108.

At block 712, the data collection platform 108 may receive instructions to initiate or terminate monitoring radio signals of one or more radio frequencies by at least one software-defined radio of the one or more RSS devices. The instructions may be inputted by an authorized user via the online user interface portal of the data collection platform 108. For example, a software-defined radio of an RSS device may be configured via the instructions such that the radio traffic (e.g., voice traffic) of a radio signal emission device (e.g., a handheld two-way radio) may be monitored and/or recorded. At block 714, the data collection platform 108 may command the at least one software-defined radio of the one or more RSS devices to initiate or terminate monitoring the radio signals of the one or more radio frequencies according to the instructions.

At block 716, the data collection platform 108 may receive additional signal intelligence data on at least one radio signal emission device from the one or more RSS devices following the reconfiguration of the one or more RSS devices. Subsequently, the process 700 may loop back to block 704.

FIG. 8 is a flow diagram of an example process 800 for commanding one or more RSS devices to interrupt the wireless communication of one or more radio signal emission devices. At block 802, the data collection platform 108 may receive signal intelligence data on one or more radio signal emission devices from one or more RSS devices. The radios signal emission devices may include mobile phones, laptop computers, Internet-of-Things (IoT) devices, cellular base stations, Wi-Fi access points, vehicle infotainment systems, two-way radios, and/or so forth. The RSS devices may have multiple form factors, such as a handheld portable device, a body-worn device that can be worn on the body of a person, a vehicle mountable device, an airborne device that is mounted on a UAV, etc.

At block 804, the data collection platform 108 may present the signal intelligence data on the one or more radio signal emission devices for analysis. In various embodiments, the signal intelligence data may be presented via an online user interface portal that shows the locations of the one or more radio signal emission devices on a digital map, as well as the device information of the one or more radio signal emission devices. The analysis may be performed by one or more authorized users of the data collection platform 108.

At block 806, the data collection platform 108 may receive instructions for the one or more RSS devices to jam a radio signal used by a radio signal emission device or emulate the radio signal emitted by the radio signal emission device. The instructions may be inputted by an authorized user via the online user interface portal of the data collection platform 108. At block 808, the data collection platform 108 may command the one or more RSS devices to jam the radio signal or emulate the radio signal via one or more radio transceivers or the one or more software-defined radios of the one or more RSS devices according to the instructions. For example, a radio transceiver of the RSS device may be activated to jam radio signals of a specific wireless communication technology and/or radio frequency in the vicinity of the device. In another example, a radio transceiver of the RSS device may be activated to emulate a cellular base station such that a radio signal emission device in the form of a cellular phone may connect to the RSS device instead of an actual cellular base station.

FIG. 9 is a flow diagram of an example process 900 for an RSS device to use a software-defined radio to collect signal intelligence data of one or more radio signal emission devices. At block 902, an RSS device may scan for signal intelligence data via at least one of one or more radio transceivers or a software-defined radio. In various embodiments, the RSS device may use at least one of the one or more radio transceivers or the software-defined radio to capture the radio signals emitted by the radio signal emission devices. The information encapsulated in the radio signals captured by a radio transceiver may be further deciphered by the communication software associated with the radio transceiver into signal intelligence data according to the communication protocol of the corresponding wireless communication technology used by the transceiver. The signal intelligence data collected by an RSS device on each radio signal emission device based on its emitted radio signals may include an identifier of the device, a device type of the device, a MAC address of the device, a signal strength measurement (e.g., received signal strength indication (RSSI)) of the radio signal emitted by the device, a signal frequency of the radio signal emitted by the device, a communication encryption protocol used by the device, a number of and device identifiers of client devices that are wirelessly connected to the device, and/or so forth.

At block 904, the RSS device may send the signal intelligence data to the data collection platform 108 via a secure communication channel. In various embodiments, the secure communication channel may be a network path that is encrypted using SSH or another comparable encryption protocol.

At block 906, the RSS device may receive a command from a data collection platform to reconfigure the RSS device by activating or deactivating at least one radio transceiver of one or more wireless communication technology types. The different wireless communication technology types may include cellular, Wi-Fi, Bluetooth, and/or so forth. At block 908, the RSS device may reconfigure by activating or deactivating the at least one radio transceiver according to the command. In various embodiments, the RSS device may activate a radio transceiver by directing the radio transceiver to be energized with electrical power or deactivate a radio transceiver by directing the radio transceiver to be de-energized, i.e., turn off electrical power to the radio transceiver. At block 910, the RSS device may scan for additional intelligent intelligence data following the reconfiguration of the RSS device.

At block 912, the RSS device may receive a command from the data collection platform 108 to reconfigure the RSS device by initiating or terminating monitoring of radio signals of one or more radio frequencies by a software-defined radio of the RSS device. At block 914, the RSS device may reconfigure by initiating or terminating the monitoring of radio signals of the one or more radio frequencies according to the command. At block 916, the RSS device may scan for additional signal intelligence data following the reconfiguration of the RSS device.

At block 918, the RSS device may receive a command from the data collection platform 108 to jam a radio signal used by a radio signal emission device or emulate the radio signal emitted by the radio signal emission device. At block 920, the RSS device may direct radio transceiver or the software-defined radio of the RSS to jam the radio signal or emulate the radio signal according to the command.

FIG. 10 is a flow diagram of an example process 1000 for an RSS device to selectively use network access nodes of multiple wireless communication technology types to transmit signal intelligence data to a data collection platform. At block 1002, an RSS device may transmit signal intelligence data to a data collection platform via a network path that is accessed using a network access node of an available wireless communication technology type. At block 1004, the RSS device may determine whether at least one additional network access nodes of a higher preference wireless communication technology type is available.

At decision block 1006, if at least one additional network access node of a higher preference wireless communication technology type is available ("yes" at decision block 1006), the process 1000 may proceed to block 1008. At block 1008, the RSS device may switch to one or more network access nodes of the higher preference wireless communication technology type to transmit the signal intelligence data to the data collection platform. At block 1010, the RSS device may transmit the signal intelligence data via the one or more network access nodes of the current wireless communication technology type until no network access node of the current wireless communication technology type is available. Nevertheless, in some embodiments, the RSS device may continuously search for one or more network access nodes of the higher preference as the RSS device transmits the signal intelligence data in block 1010, such that the RSS device may switch to one or more network access nodes of the higher preference wireless communication technology type and use them to transmit the signal intelligence data to the data collection platform 108.

At block 1012, the RSS device may determine whether at least one network access node of a lower preference wireless communication technology type is available. At decision block 1014, if at least one additional network access node of a lower preference wireless communication technology type is available ("yes" at decision block 1012), the process 1000 may proceed to block 1016. At block 1016, the RSS device may switch to one or more network access nodes of the lower preference wireless communication technology type to transmit the signal intelligence data. However, if no additional network access node of a lower preference wireless communication technology type is available ("no" at decision block 1012), the process 1000 may proceed to block 1018.

At block 1018, the RSS device may terminate the transmission of the signal intelligence data and wait for network access nodes of at least one wireless communication technology type that is compatible with the RSS device to become available. Subsequently, the process 1000 may loop back to block 1002. Returning to decision block 1006, if at no network access node of a higher preference wireless communication technology type is available ("no" at decision block 1006), the process 1000 may proceed to block 1010.

Figure 11:
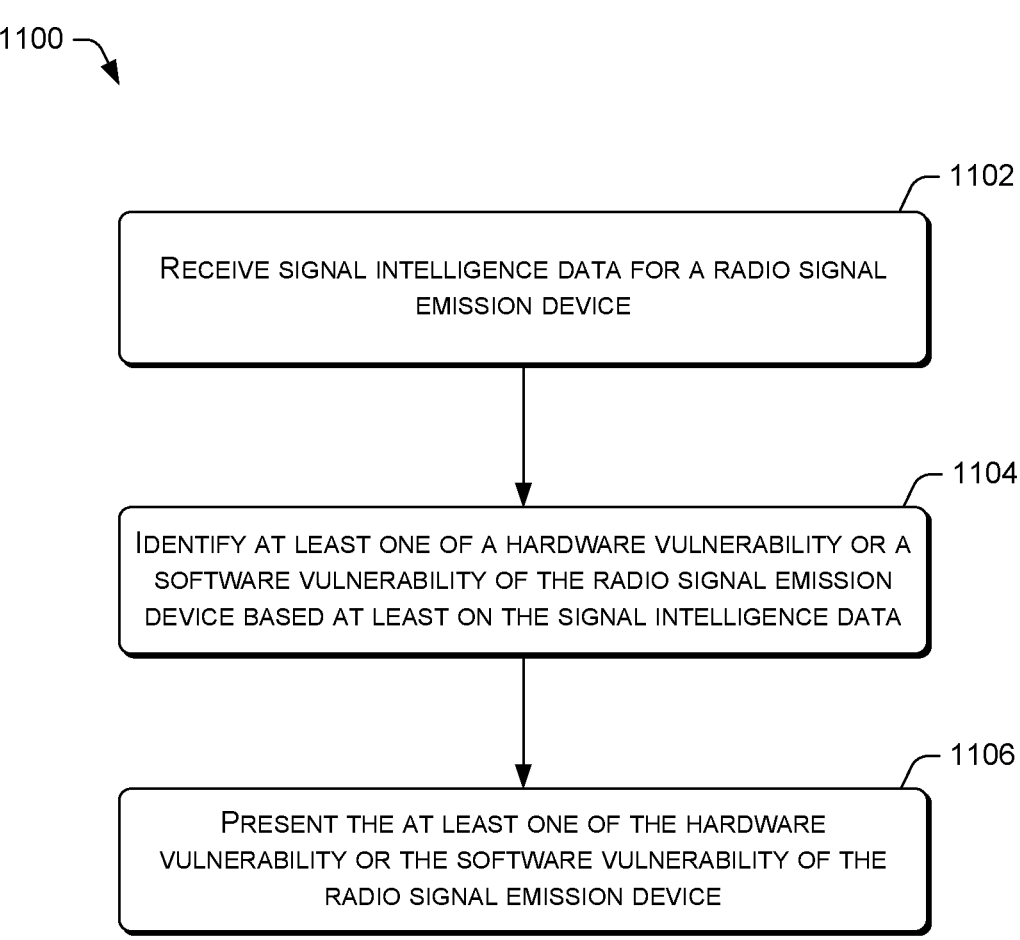
FIG. 11 is a flow diagram of an example process for identifying vulnerabilities of a radio signal emission device based on radio signal data of the radio signal emission device.

FIG. 11 is a flow diagram of an example process 1100 for identifying vulnerabilities of a radio signal emission device based on radio signal data of the radio signal emission device. At block 1102, the data collection platform 108 may receive signal intelligence data for a radio signal emission device. For example, the radios signal emission devices may be a mobile phone, a laptop computer, an Internet-of-Things (IoT) device, a cellular base station, a Wi-Fi access point, a vehicle infotainment system, or a two-way radio.

At block 1104, the data collection platform 108 may identify at least one of a hardware vulnerability or a software vulnerability of the signal emission device based at least on the signal intelligence data. For example, the data collection platform 108 may use the device identification information of radio signal emission device as extracted from signal intelligence data to lookup hardware and/or software vulnerabilities of the device from a vulnerability database. At block 1106, the data collection platform 108 may present the at least one of the hardware vulnerability or the software vulnerability of the radio signal emission device. In various embodiments, the vulnerabilities may be presented via an online user interface portal of the data collection platform 108 to one or more authorized users. In some embodiments, the data collection platform 108 may further present information on one or more exploits that take advantage of the vulnerabilities and/or user interface controls for initiating such exploits on the radio signal emission devices with such vulnerabilities.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A radio signal surveillance (RSS) device, comprising:
   one or more processors;
   a plurality of radio transceivers of multiple wireless communication technology types;
   a software-defined radio; and memory including a plurality of computer-executable components that are executable by the one or more processors to perform a plurality of actions, the plurality of actions comprising:

scanning for signal intelligence data via at least one of one or more transceivers or the software-defined radio that monitors radio signals of one or more radio signal emission devices;

sending the signal intelligence data via a secure communication channel to a data collection platform;

receiving a command from the data collection platform to deactivate or activate at least one radio transceiver of one or more wireless communication technology types;

activating or deactivating at least one radio transceiver of the one or more wireless communication technology types according to the command; and scanning for additional signal intelligence data via at least one of one or more transceivers or the software-defined radio that monitors radio signals of one or more radio signal emission devices.

2. The RSS device of claim 1, wherein the multiple wireless communication technology types include at least one of cellular, Wi-Fi, Bluetooth, or military radio band.

3. The RSS device of claim 1, wherein the plurality of radio transceivers include multiple radio transceivers of a particular wireless communication technology type.

4. The RSS device of claim 3, wherein a first radio transceiver of the multiple radio transceivers of a particular wireless communication technology type is used to monitor a radio signal of a radio signal emission device, and a second radio transceiver of the multiple radio transceivers of the particular wireless communication technology type is used to communicate with the data collection platform.

5. The RSS device of claim 1, wherein the RSS device is a handheld portable device, a body-worn device, a device that is mounted to a non-airborne vehicle, or a device that is mounted to an unmanned aerial vehicle (UAV).

6. The RSS device of claim 1, wherein the signal intelligence data collected for a radio signal emission device includes at least one of an identifier of the radio signal emission device, a device type of the radio signal emission device, a MAC address of a radio signal emission device, a signal strength measurement of a radio signal emitted by the radio signal emission device, a signal frequency of the radio signal emitted by the radio signal emission device, a communication encryption protocol used by the radio signal emission device, or a number of and device identifiers of client devices that are wirelessly connected to the radio signal emission device.

7. The RSS device of claim 1, wherein the plurality of actions further comprise:

receiving an additional command from the data collection platform to initiate or terminate monitoring of radio signals of one or more radio frequencies by the software-defined radio;

initiating or terminating the monitoring of the radio signals of the one or more radio frequencies by the software-defined radio according to the additional command; and scanning for additional signal intelligence data via the software-defined radio.

8. The RSS device of claim 1, wherein the plurality of actions further comprise:

receiving an additional command from the data collection platform to jam a radio signal used by a radio signal emission device or emulate the radio signal emitted by the radio signal emission device; and directing a radio transceiver or a software-defined radio to jam the radio signal of the radio signal emission device or emulate the radio signal of the radio signal emission device.

9. The RSS device of claim 1, wherein the sending the signal intelligence data includes:

transmitting the signal intelligence data to the data collection platform via a network path that is accessed using one or more network access nodes of an available wireless communication technology type;

determining that at least one additional network access node of a higher preference wireless communication technology type is available; and in response to determining that the at least one additional network access node of the higher preference wireless communication technology is available, switching to the one or more network access nodes of the higher preference wireless communication technology type to transmit the signal intelligence data to the data collection platform.

10. The RSS device of claim 1, wherein the sending the signal intelligence data includes:

transmitting the signal intelligence data to the data collection platform via a network path that includes one or more network access nodes of a current wireless communication technology type until no network access nodes of the current wireless communication technology type is available;

determining that at least one network access node of a lower preference wireless communication technology type is available; and in response to determining that the at least one network access node of the lower preference wireless communication technology type is available, switching to the one or more network access nodes of the lower preference wireless communication technology to transmit the signal intelligence data to the data collection platform.

11. The RSS device of claim 1, wherein the sending the signal intelligence data includes using an additional RSS device to relay the signal intelligence data from the RSS device to the data collection platform.

12. The RSS device of claim 1, wherein the sending the signal intelligence data includes sending the signal intelligence data to the data collection platform via a network path that includes a software-defined mesh network.

13. The RSS device of claim 1, wherein the plurality of actions further comprise relaying additional signal intelligence data collected by another RSS device to the data collection platform.

14. The RSS device of claim 1, further comprising a user interface panel for manually activating or deactivating at least one radio transceiver of the one or more wireless communication technology types.

15. One or more non-transitory computer-readable media of a radio signal surveillance (RSS) device storing computer-executable instructions that upon execution cause one or more processors of the RSS device to perform acts comprising:

scanning for signal intelligence data via at least one of one or more transceivers or a software-defined radio that monitors radio signals of one or more radio signal emission devices;

sending the signal intelligence data via a secure communication channel to a data collection platform;

receiving a command from the data collection platform to deactivate or activate at least one radio transceiver of one or more wireless communication technology types;

activating or deactivating at least one radio transceiver of the one or more wireless communication technology types; and scanning for additional signal intelligence data via at least one of one or more transceivers or the software-defined radio that monitors radio signals of one or more radio signal emission devices.

16. The one or more non-transitory computer-readable media of claim 15, wherein the acts further comprise:

receiving an additional command from the data collection platform to initiate or terminate monitoring of radio signals of one or more radio frequencies by the software-defined radio;

initiating or terminating the monitoring of the radio signals of the one or more radio frequencies by the software-defined radio; and scanning for additional signal intelligence data via the software-defined radio.

17. The one or more non-transitory computer-readable media of claim 15, wherein the acts further comprise:

receiving an additional command from the data collection platform to jam a radio signal used by a radio signal emission device or emulate the radio signal emitted by the radio signal emission device; and directing a radio transceiver or a software-defined radio to jam the radio signal of the radio signal emission device or emulate the radio signal of the radio signal emission device.

18. The one or more non-transitory computer-readable media of claim 15, wherein the sending the signal intelligence data includes:

transmitting the signal intelligence data to the data collection platform via a network path that is accessed using one or more network access nodes of an available wireless communication technology type;

determining that at least one additional network access node of a higher preference wireless communication technology type is available; and in response to determining that the at least one additional network access node of the higher preference wireless communication technology is available, switching to the higher preference wireless communication technology type to transmit the signal intelligence data to the data collection platform.

19. The one or more non-transitory computer-readable media of claim 15, wherein the sending the signal intelligence data includes:

transmitting the signal intelligence data to the data collection platform via a network path that includes one or more network access nodes of a current wireless communication technology type until no network access nodes of the current wireless communication technology type is available;

determining that at least one network access node of a lower preference wireless communication technology type is available; and in response to determining that the at least one network access node of the lower preference wireless communication technology type is available, switching to the one or more network access nodes of the lower preference wireless communication technology to transmit the signal intelligence data to the data collection platform.

20. A computer-implemented method, comprising:

scanning for signal intelligence data via at least one of one or more transceivers or a software-defined radio included in a radio signal surveillance (RSS) device that monitors radio signals of one or more radio signal emission devices;

sending the signal intelligence data from the RSS Device via a secure communication channel to a data collection platform;

receiving, at the RSS device, a command from the data collection platform to deactivate or activate at least one radio transceiver of one or more wireless communication technology types;

activating or deactivating at least one radio transceiver of the one or more wireless communication technology types included in the RSS device; and scanning for additional signal intelligence data via at least one of one or more transceivers or the software-defined radio included in the RSS device that monitors radio signals of one or more radio signal emission devices.

* * * * *